(12) United States Patent
Lin et al.

(10) Patent No.: US 11,808,927 B2
(45) Date of Patent: Nov. 7, 2023

(54) LENS ASSEMBLY

(71) Applicant: Rays Optics Inc., Hsinchu County (TW)

(72) Inventors: Ying-Hsiu Lin, Hsinchu (TW); Hung-You Cheng, Hsinchu (TW); Kuo-Chuan Wang, Hsinchu (TW)

(73) Assignee: RAYS OPTICS INC., Hsinchu County (TW)

(*) Notice: Subject to any disclaimer, the term of this patent is extended or adjusted under 35 U.S.C. 154(b) by 247 days.

(21) Appl. No.: 17/218,210

(22) Filed: Mar. 31, 2021

(65) Prior Publication Data
US 2021/0215916 A1 Jul. 15, 2021

Related U.S. Application Data

(63) Continuation of application No. 16/160,987, filed on Oct. 15, 2018, now abandoned.

(30) Foreign Application Priority Data

Jun. 15, 2018 (TW) ................................ 107120644

(51) Int. Cl.
| | | |
|---|---|---|
| G02B 3/00 | (2006.01) | |
| G02B 9/00 | (2006.01) | |
| G02B 3/02 | (2006.01) | |
| G02B 13/18 | (2006.01) | |
| G02B 9/64 | (2006.01) | |
| G02B 9/60 | (2006.01) | |
| G02B 9/62 | (2006.01) | |

(52) U.S. Cl.
CPC ............... G02B 13/18 (2013.01); *G02B 9/60* (2013.01); *G02B 9/62* (2013.01); *G02B 9/64* (2013.01)

(58) Field of Classification Search
CPC ... G02B 9/64; G02B 9/60; G02B 9/62; G02B 13/18; G02B 13/006; G02B 13/0045
USPC ........ 359/708, 714–716, 754, 755, 784, 797
See application file for complete search history.

(56) References Cited

U.S. PATENT DOCUMENTS

| | | | | |
|---|---|---|---|---|
| 2004/0240080 | A1* | 12/2004 | Matsui ................. | G02B 13/006 359/754 |
| 2015/0092100 | A1* | 4/2015 | Chen ..................... | G02B 13/16 348/349 |
| 2018/0326909 | A1* | 11/2018 | Iwashita ................... | B60R 1/02 |
| 2019/0018215 | A1* | 1/2019 | Chang ..................... | G02B 7/04 |
| 2019/0049698 | A1* | 2/2019 | Chen .................. | G02B 13/0045 |
| 2019/0086646 | A1* | 3/2019 | Chen ................... | G02B 13/006 |
| 2019/0243093 | A1* | 8/2019 | Wenren .................... | G02B 9/62 |
| 2019/0331900 | A1* | 10/2019 | Yao .................... | G02B 13/0045 |
| 2020/0004125 | A1* | 1/2020 | Okano ..................... | G02B 9/64 |

\* cited by examiner

*Primary Examiner* — Mahidere S Sahle

(57) ABSTRACT

A lens assembly including 4~7 lenses with a refractive power is provided. D1 is the diameter of a lens surface farthest away from the image plane of the lens assembly. DL is the diameter of a lens surface closest to the image plane of the lens assembly. LT is the length on an optical axis of the lens from the lens surface farthest away from the image plane of the lens assembly to the lens surface closest to the image plane of the lens assembly. The lens assembly satisfies the following conditions: (1) 6 mm<DL<20 mm, 1.5<LT/DL<2.4 and D1/DL>0.6 or (2) 6 mm<DL<20 mm, 1.25<LT/DL<1.7 and D1/DL>0.4.

20 Claims, 18 Drawing Sheets

LENS ASSEMBLY

This application is a continuation application of U.S. patent application Ser. No. 16/160,987 filed Oct. 15, 2018, which claims the benefit of Taiwan application Serial No. 107120644, filed Jun. 15, 2018, the subject matter of which is incorporated herein by reference.

BACKGROUND OF THE INVENTION

Field of the Invention

The invention relates in general to a lens assembly.

Description of the Related Art

Along with the development in technology, the variety of lenses is getting more and more diversified. The lens used in vehicles is a commonly seen lens. Currently, higher and higher requirements, such as thinness and better optical features, are expected of the lens. To satisfy the said requirements, the lens basically needs to possess the features of lower cost, higher resolution, larger aperture, larger target surface and lighter weight. Therefore, it has become a prominent task for the industries to provide an image lens having the features of lighter weight, lower manufacturing cost, and better optical quality.

The description of related art is provided to facilitate the understanding of the present invention. Therefore, the contents disclosed in the related art may include some technologies not generally known to anyone ordinarily skilled in the technology field of the present invention. The contents disclosed in the related art and the problems that one or more than one embodiment of the present invention aims to resolve are not necessarily known to or acknowledged by anyone ordinarily skilled in the technology field of the present invention before the application of the present invention is filed.

SUMMARY OF THE INVENTION

Other objects and advantages of the present invention can be understood from the technical features disclosed in the embodiments of the present invention.

According to one embodiment of the present invention, a lens assembly including 4~7 lenses with a refractive power is provided. D1 is the diameter of a lens surface farthest away from the image plane of the lens assembly. DL is the diameter of a lens surface closest to the image plane of the lens assembly. LT is the length on an optical axis of the lens from the lens surface farthest away from the image plane of the lens assembly to the lens surface closest to the image plane of the lens assembly. The lens assembly satisfies the following conditions: (1) 6 mm<DL<20 mm, 1.5<LT/DL<2.4 and D1/DL>0.6 or (2) 6 mm<DL<20 mm, 1.25<LT/DL<1.7 and D1/DL>0.4. In the present embodiment, the lens includes 4~7 lenses which can be divided into a front lens group and a rear lens group. The rear lens group includes an aspheric lens. Thus, an image lens having the features of lighter weight, lower manufacturing cost, large target surface and better optical quality can be achieved.

According to another embodiment of the present invention, a lens assembly including a combined lens, a spherical lens and an aspheric lens is provided. The combined lens is formed of two lenses and includes corresponding adjacent surfaces whose radii of curvature are substantially identical. The aspheric lens is closer to the image plane of the lens assembly than the combined lens. At most one lens is disposed between the aspheric lens and the image plane of the lens assembly. The lens includes 4~7 lenses with a refractive power. DFOV is the diagonal field of view of the lens. DL is the diameter of a lens surface closest to the image plane of the lens assembly. LT is the length on an optical axis of the lens from a lens surface farthest away from the image plane of the lens assembly to the lens surface closest to the image plane of the lens assembly. The lens assembly satisfies the following conditions: 40°<DFOV<60°, 6 mm<DL<20 mm, 1.5<LT/DL<2.4. In the present embodiment, the lens includes 4~7 lenses including a spherical lens, a combined lens and an aspheric lens. Thus, an image lens having the features of lighter weight, lower manufacturing cost, longer focal length, large target surface and better optical quality can be achieved.

According to an alternate embodiment of the present invention, a lens assembly including a combined lens, a spherical lens and an aspheric lens is provided. The combined lens is formed of two lenses and includes corresponding adjacent surfaces whose radii of curvature are substantially identical. The aspheric lens is closer to the image plane of the lens assembly than the combined lens. At most one lens is disposed between the aspheric lens and the image plane of the lens assembly. The lens includes 4~7 lenses with a refractive power. The Abbe number of at least one lens of the combined lens and the Abbe number of the aspheric lens both are greater than 60. The surface of the aspheric lens facing the image plane of the lens assembly on the lens optical path is protruded towards the image plane of the lens assembly. In the present embodiment, the lens includes 4~7 lenses including a spherical lens, a combined lens and an aspheric lens. Thus, an image lens having the features of lighter weight, lower manufacturing cost, longer focal length, large target surface and better optical quality can be achieved.

Through the design disclosed in the embodiments of the present invention, an image lens possessing the optical features of excellent optical quality and light weight and capable of reducing manufacturing cost and improving optical quality is provided. Based on the design that the optical lens includes 4~7 lenses and that the total track length (TTL) from the lens to the sensor is less than 25 mm and the maximum outer diameter of the mechanism is less than 14 mm, the optical lens assembly advantageously possesses the features of larger aperture, higher resolution (5 million pixels), lighter weight, longer effective focal length (EFL=12 mm), and larger target surface (1/2.5 inch), the manufacturing cost can be reduced and the optical quality can be improved.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIGS. 2~3 respectively are a ray fan plot and a longitudinal aberration graph of the lens assembly 10a.

DETAILED DESCRIPTION OF THE INVENTION

The technical contents, features, and effects of the present invention are disclosed below in a number of embodiments with accompanying drawings. Directional terms such as above, under, left, right, front or back are used in the following embodiments to indicate the directions of the accompanying drawings, not for limiting the present invention. Moreover, ordinal numbers, such as "the first" and "the second", are used in the following embodiments to clearly distinguish the elements having the same designations, not for limiting the said element.

The optical elements in the present invention refer to the elements partly or completely of reflective or transmissive materials normally including glass or plastics. Examples of the optical elements include lens, prism or aperture.

When the lens is used in an imaging system, the image magnification side (object side, the first side) refers to the side of the lens assembly closer to the object to be shot on the optical path, and the image reduction side (imaging side, the second side) refers to the side of the lens assembly closer to the sensor on the optical path.

When the image magnification side (or the image reduction side) of a lens has a convex portion (or a concave portion) at a particular area, this implies that the said area is more protruded (or recessed) towards a direction parallel to the optical path than outer area adjacent to the said area.

Figure 1:
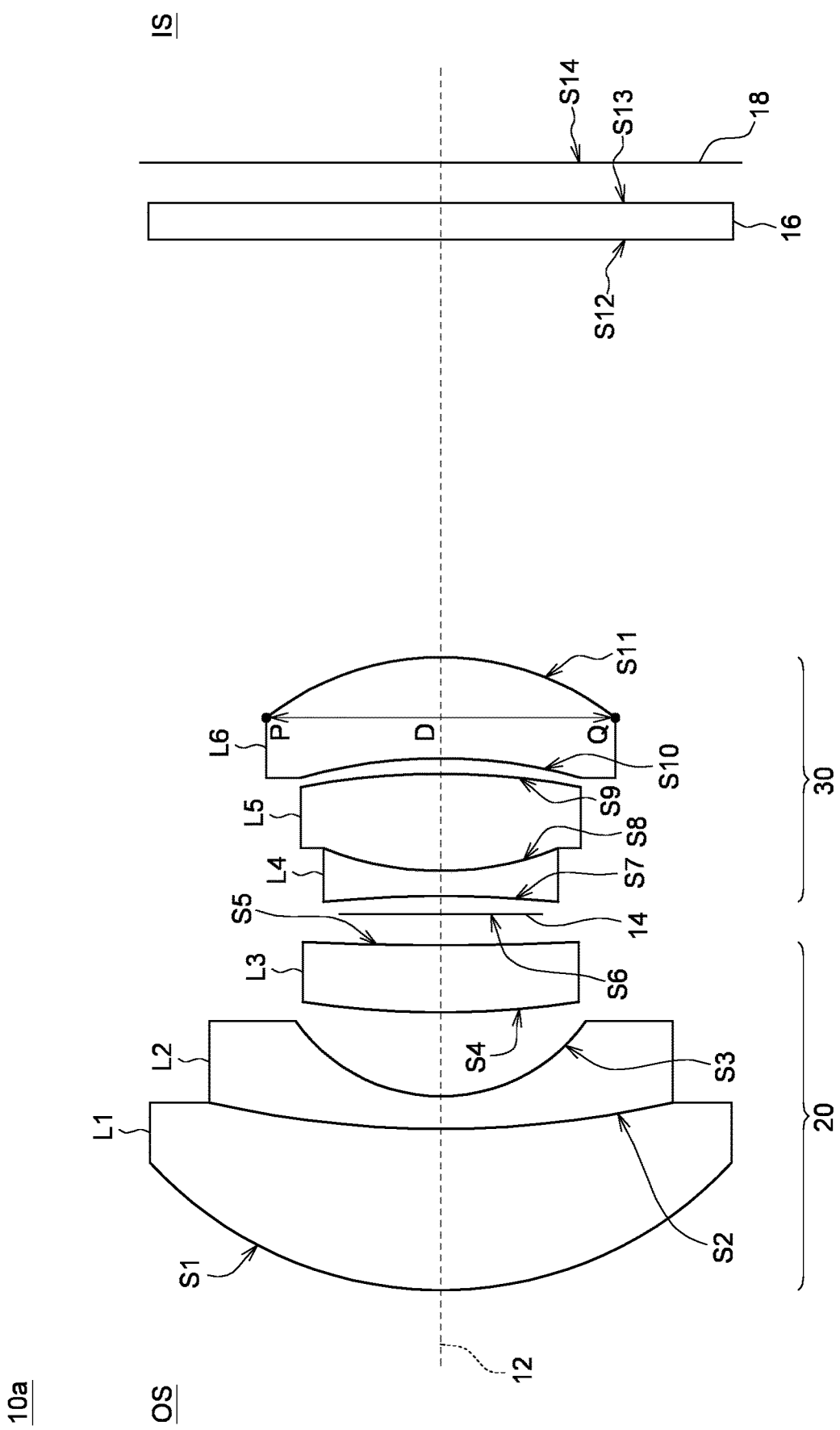
FIG. 1 is a schematic diagram of a lens assembly 10a according to a first embodiment of the present invention.

FIG. 1 is a schematic diagram of a lens assembly 10a according to a first embodiment of the present invention. Refer to FIG. 1. In the present embodiment, the lens assembly 10a includes a lens barrel (not illustrated), within which a first lens L1, a second lens L2, a third lens L3, an aperture 14 and a fourth lens L4, a fifth lens L5 and a sixth lens L6 are arranged from the first side (the image magnification side/object side/OS) to the second side (the image reduction side/imaging side/IS). The first lens L1, the second lens L2 and the third lens L3 form a first lens group (such as a front group) 20 with a negative refractive power. The fourth lens L4, the fifth lens L5 and the sixth lens L6 form a second lens group (such as a rear lens group) 30 with a positive refractive power. Moreover, a filter 16 and an image sensor (not illustrated) are disposed on the image reduction side IS. The image plane of the lens assembly 10a of a visible light at an effective focal length is designated by 18. The filter 16 is disposed between the second lens group 30 and the image plane 18 of the lens assembly 10a of a visible light at an effective focal length. In the present embodiment, the refractive powers of the first lens L1 to the sixth lens L6 sequentially are: positive (+), negative (−), positive, negative, positive, positive, and the sixth lens is an aspheric glass lens. In an embodiment, aspheric glass lenses can be replaced by aspheric plastics lenses. Additionally, the lenses whose adjacent surfaces have substantially identical radius of curvature (the difference in the radius of curvature is less than 0.005 mm) or completely identical radius of curvature can form one combined lens/glued lens/doublet lens/triplet lens. In the present embodiment, the first lens L1 and the second lens L2 form one combined lens, and the fourth lens L4 and the fifth lens L5 also form the other combined lens, but the present invention are not limited thereto. In each diagram of each embodiment of the present invention, the image magnification side OS is located at the left-hand side and the image reduction side IS is located at the right-hand side, and the similarities are not repeated here.

In the present invention, the aperture 14 refers to an aperture stop. The aperture is an independent element or is integrated in other optical elements. In the present embodiment, the aperture achieves a similar effect by blocking the light on the peripheral part using a mechanism member but keeping the central part permeable to the light. The said mechanism member can be adjustable, which means the position, shape and transparency of the mechanism member can be adjusted. Or, the aperture can limit the optical path by coating an opaque light absorbing material on the surface of the lens but keeping the central part permeable to the light.

Each lens has a surface diameter. As indicated in FIG. 1, the surface diameter of a lens refers to the distance (such as surface diameter D), in a direction perpendicular to an optical axis, between two edge turning points P and Q at the two ends of the optical axis 12 of the lens. In the present embodiment, the surface S1 has a diameter of 10 mm, and the surface S11 has a diameter of 6.2 mm.

The design parameters, shapes and aspheric coefficients of the lens assembly 10a are listed in Table 1 and Table 2. In a design example of the present invention, the aspheric polynomial can be expressed as:

$$Z = \frac{cr^2}{1+\sqrt{1-(1+k)c^2r^2}} + Ar^4 + Br^6 + Cr^8 + Dr^{10} + Er^{12} + Fr^{14} + \ldots \quad (1)$$

In the formula (1), Z represents a sag along the direction of the optical axis; c represents a reciprocal of the radius of an osculating sphere, that is, the reciprocal of the radius of curvature close to the optical axis; k represents a conic coefficient; r represents an aspheric height, that is, the height from the center to the edge of the lens. In Table 2, columns A-G respectively represent the values of the coefficients of the $4^{th}$, the $6^{th}$, the $8^{th}$, the $10^{th}$, the $12^{th}$, the $14^{th}$, and the $16^{th}$ order terms of the spherical polynomial. However, the data exemplified below are not for limiting the present invention. Any person ordinary skilled in the technology field can make necessary modifications or adjustments to the parameters or setting of the present invention, and the said modifications or adjustments are still within the scope of the present invention.

TABLE 1

F/# = 2.65; TTL = 23.0 (mm)
DFOV = 45°; LT/DL = 2.112
D1/DL = 1.639; IMH = 5.15 (mm)

| Surface | Radius of curvature (mm) | Interval (mm) | Refractive power | Abbe number | Element |
|---|---|---|---|---|---|
| S1 | 6.18 | 3.26 | 1.95 | 32.32 | L1 (concave convex) (meniscus) |
| S2 | 15.21 | 0.67 | 1.78 | 25.68 | L2 (convex concave) (meniscus) |
| S3 | 2.94 | 1.67 | | | |
| S4 | 12.78 | 1.41 | 1.90 | 31.32 | L3 (concave convex) (meniscus) |
| S5 | 38.87 | 0.63 | | | |
| S6 | INF. | 0.32 | | | Aperture 14 |
| S7 | −13.21 | 0.50 | 1.55 | 45.78 | L4 (bi-concave) |
| S8 | 4.39 | 2.01 | 1.60 | 67.74 | L5 (bi-convex) |
| S9 | −10.22 | 0.29 | | | |
| S10* | −10.03 | 2.13 | 1.50 | 81.5 | L6 (aspheric) |
| S11* | −4.03 | 8.53 | | | |
| S12 | INF. | 0.71 | 52.0 | 54.5 | Filter 16 |
| S13 | INF. | 0.83 | | | |
| S14 | | | | | Image plane 18 |

TABLE 2

| | S10* | S11* |
|---|---|---|
| k | 0 | 0 |
| A | −1.08E−03 | 7.70E−04 |
| B | −8.60E−05 | −9.03E−06 |
| C | 1.74E−06 | 3.71E−06 |
| D | 1.18E−06 | −7.46E−08 |
| E | −1.20E−07 | 2.08E−08 |

The interval of the surface S1 is the distance on the optical axis 12 from the surface S1 to the surface S2. The interval of the surface S2 is the distance on the optical axis 12 from the surface S2 to the surface S3. The interval of the surface S13 is the distance on the optical axis 12 from the surface S13 to the image plane 18 of a visible light at an effective focal length.

In the tables, the surface with a * sign is an aspheric surface, and the surface without the * sign is a spherical surface.

The radius of curvature refers to the reciprocal of the curvature. When the radius of curvature is positive, the sphere center of the lens surface is located at the image reduction side of the lens assembly. When the radius of curvature is negative, the sphere center of the lens surface is located at the image magnification side of the lens assembly. The concavity and convexity of each lens are listed in above tables.

The aperture value of the present invention is represented by F/# as indicated in above tables. When the lens of the present invention is used in a projection system, the image plane is a light valve surface. When the lens is used in an imaging system, the image plane refers to the surface of the sensor.

When the lens is used in an imaging system, the image height IMH is ½ of the length of the image circle on the image plane as indicated in above tables.

In the present invention, the total length of the lens is represented by LT as indicated in above tables. To be more specifically, in the present embodiment, the total length refers to the distance on the optical axis 12 of the lens assembly 10a from the optical surface S1 closest to the image magnification side to the optical surface S11 closest to the image reduction side. The total length (LT) of the lens is less than 23 mm.

In the present embodiment, the diagonal field of view DFOV refers to the receiving angle of the optical surface S1 closest to the image magnification end, that is, the field of view measured using the image circle as indicated in above tables.

Figure 2:
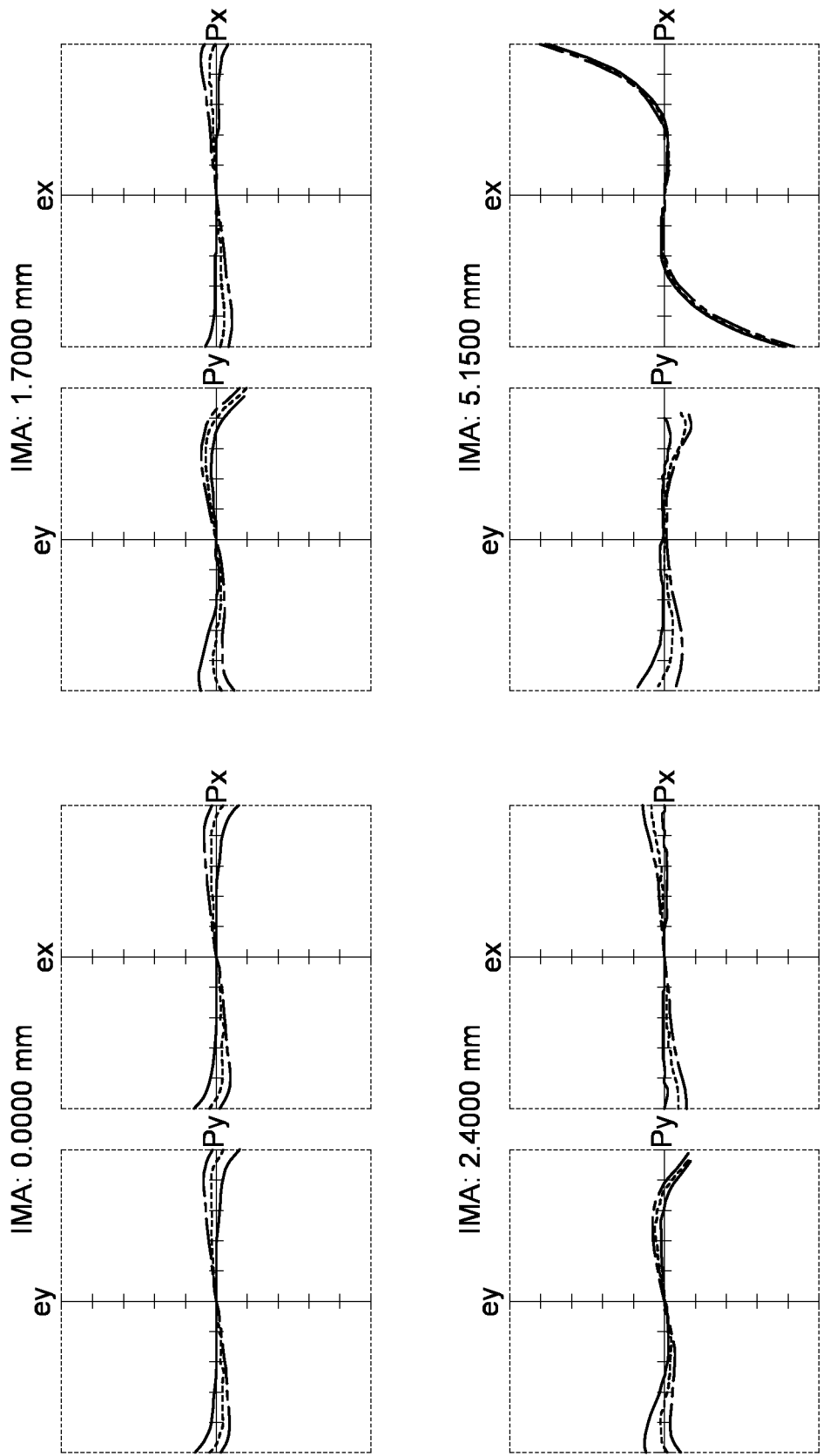
Figure 3:
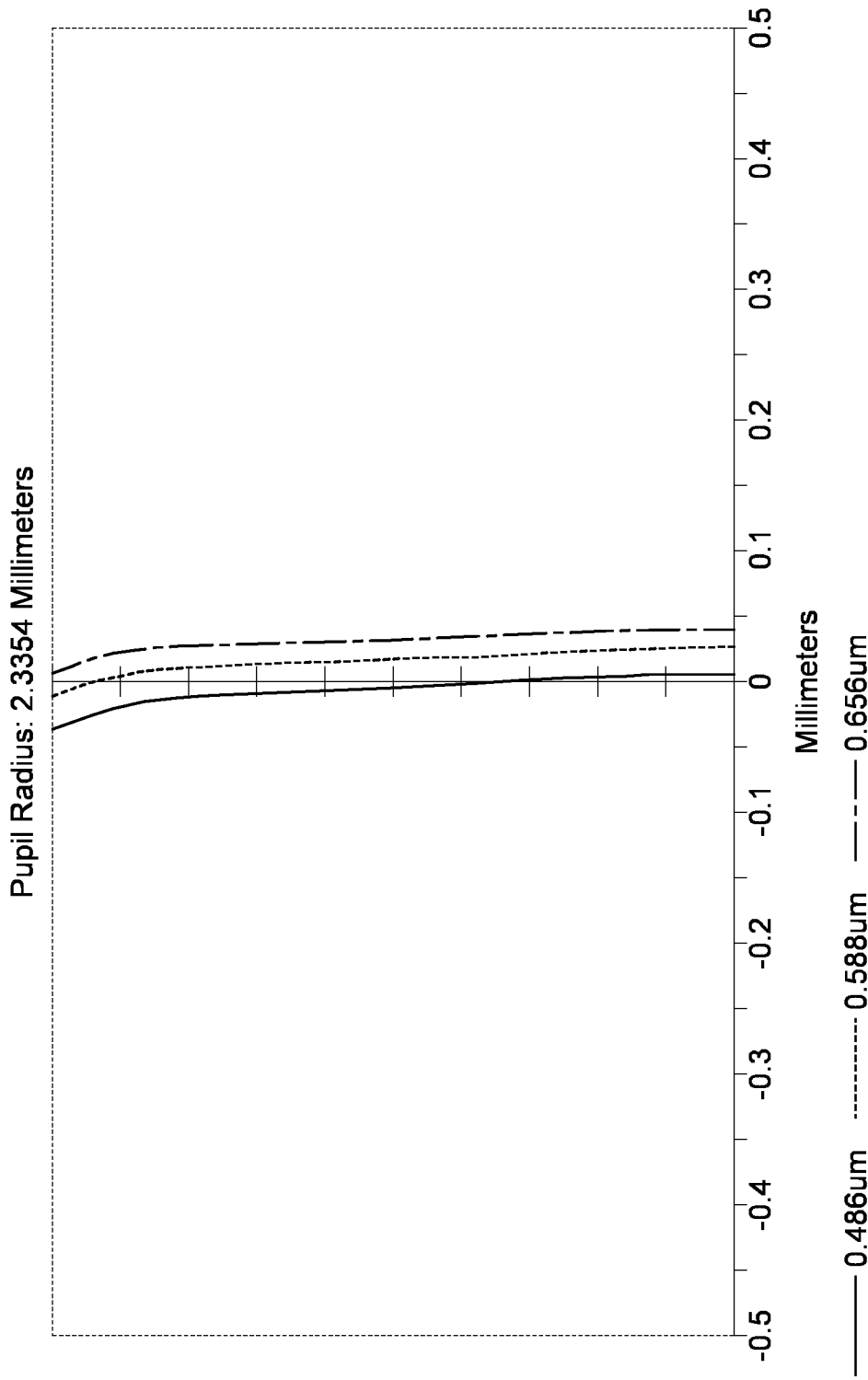

FIGS. 2~3 are based on the simulation data of the lens assembly 10a of the present embodiment. FIG. 2 is a ray fan plot of a visible light, wherein X axis represents the position at which a ray enters the pupil, Y axis represents a relative value of the position at which the chief ray is projected to an image plane (such as the image plane 18). FIG. 3 is a graph of longitudinal aberration of the lens assembly 10a, wherein the three curves from left to right are generated by an incident light having a wavelength of: 0.486 µm, 0.588 µm, 0.656 µm, respectively. The simulation data as illustrated in FIGS. 2~3 are all within standard ranges and suffice to verify that the lens assembly 10a of the present embodiment really possesses excellent optical quality.

The lens assembly according to an embodiment of the present invention includes a front lens group and a rear lens group. The front group includes two lenses for receiving the light, but the present invention is not limited thereto. The aperture value of the lens is greater than or equivalent to 2.6. The rear group includes a combined lens (a glued lens or a doublet lens) and an aspheric lens for correcting aberration and color aberration. The minimum distance between the two lenses of the doublet lens along the optical axis is less than 0.05 mm. The doublet lens can be replaced by a triplet lens, but the present invention is not limited thereto. Each of the doublet lens, the glued lens, the combined lens, and the triplet lens has corresponding adjacent surfaces whose radii of curvature are substantially identical or similar. The lens includes 4~7 lenses with a refractive power, and at least two lenses have an Abbe number greater than 60.

In an embodiment, the lens assembly satisfies the following condition: 6 mm<DL<20 mm. In another embodiment, the lens assembly satisfies the following condition: 6.5 mm<DL<19 mm. In an alternate embodiment, the lens assembly satisfies the following condition: 7 mm<DL<18 mm. DL represents the diameter of the lens surface closest to the image plane of the lens assembly, so that the imaging light entering the lens can converge to be near the size of the image sensor, and a better optical effect can be obtained in a finite space.

In an embodiment, the lens assembly satisfies the following conditions: 0.6<D1/DL and 1.5<LT/DL<2.4. In another embodiment, the lens assembly satisfies the following conditions: 0.62<D1/DL and 1.55<LT/DL<2.35. In an alternate embodiment, the lens assembly satisfies the following conditions: 0.64<D1/DL and 1.6<LT/DL<2.3. Thus, the image sensor corresponds to a better design range of the total length of the lenses. D1 is the diameter of a lens surface farthest away from the image plane of the lens assembly. DL is the diameter of a lens surface closest to the image plane of the lens assembly. LT is the distance on the optical axis from the optical surface lens closest to the image magnification side to the optical surface closest to the image reduction side.

In an embodiment, the lens assembly satisfies the following conditions: 0.4<D1/DL and 1.25<LT/DL<1.7. In another embodiment, the lens assembly satisfies the following conditions: 0.42<D1/DL and 1.27<LT/DL<1.68. In an alternate embodiment, the lens assembly satisfies the following conditions: 0.44<D1/DL and 1.29<LT/DL<1.66. Thus, the image sensor corresponds to a better design range of the total length of the lenses. D1 is the diameter of a lens surface farthest away from the image plane of the lens assembly. DL is the diameter of a lens surface closest to the image plane of the lens assembly. LT is the distance on the optical axis from the optical surface lens closest to the image magnification side to the optical surface closest to the image reduction side.

Figure 4:
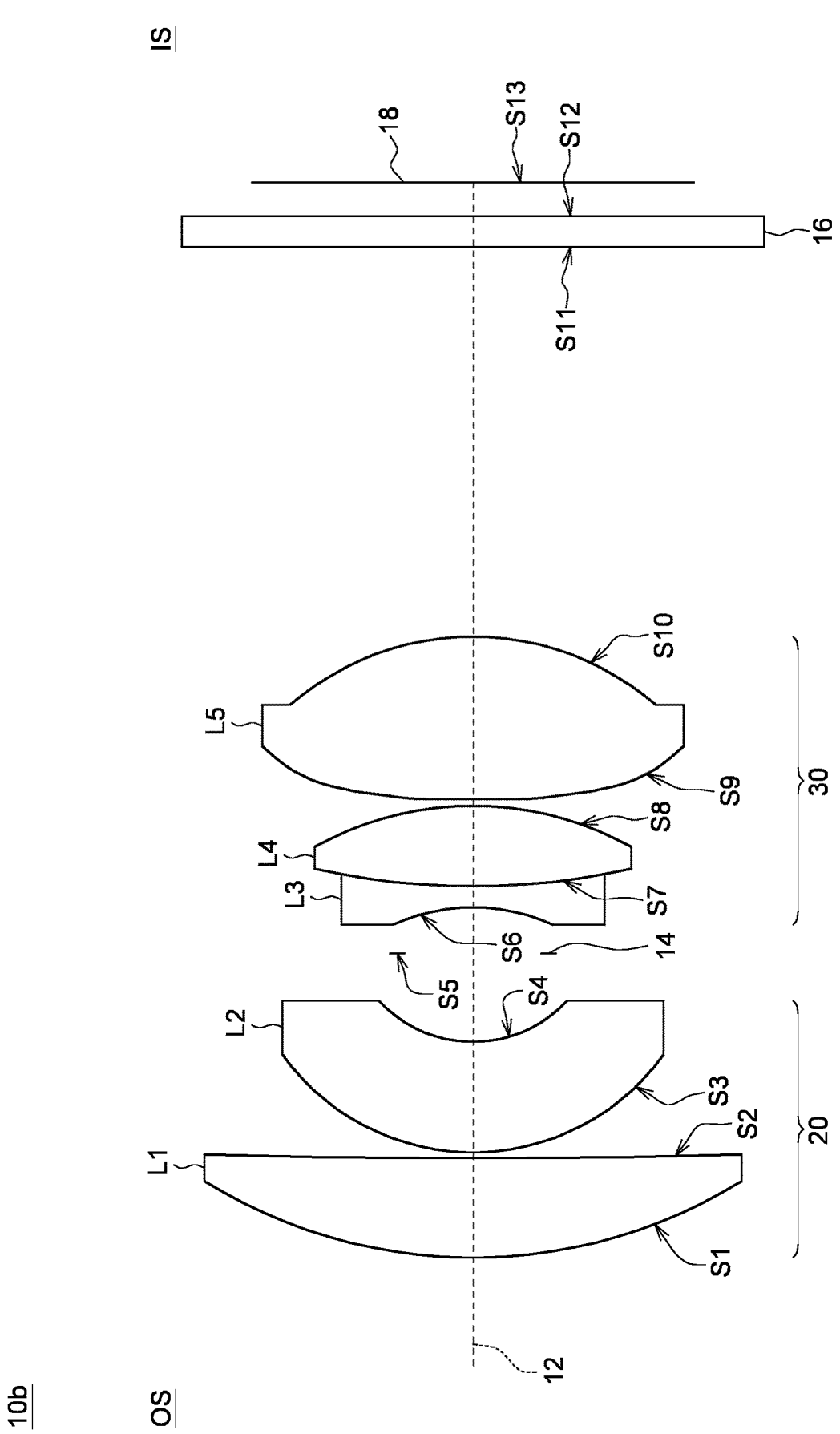
FIG. 4 is a schematic diagram of a lens assembly 10b according to a second embodiment of the present invention.

The design of a lens assembly according to a second embodiment of the present invention is disclosed below. FIG. 4 is a schematic diagram of a lens assembly 10b according to a second embodiment of the present invention. The first lens L1 and the second lens L2 form a first lens group (such as a front lens group) 20 with a negative refractive power. The third lens L3, the fourth lens L4 and the fifth lens L5 form a second lens group (such as a rear lens group) 30 with a positive refractive power. In the present embodiment, the refractive powers of the first lens L1 to the fifth lens L5 of the lens assembly 10b sequentially are: positive, negative, negative, positive, positive, all lenses are formed of glass, and the fifth lens L5 is an aspheric lens. In the present embodiment, the aspheric lens is formed by the glass molding method. In an embodiment, aspheric glass lenses can be replaced by aspheric plastics lenses. In the present embodiment, the third lens L3 and the fourth lens L4 also form one combined lens, but the present invention is not limited thereto. In the present embodiment, the surface S1 has a diameter of 11.12 mm, and the surface S10 has a diameter of 8.68 mm. The design parameters of the lens assembly 10b and the peripheral elements are listed in Table 3.

TABLE 3

F/# = 2.6; TTL = 25.0 (mm)
DFOV = 45.5°; LT/DL = 1.664
D1/DL = 1.281; IMH = 5.15 (mm)

| Surface | Radius of curvature (mm) | Interval (mm) | Refractive power | Abbe number | Element |
|---|---|---|---|---|---|
| S1 | 11.97 | 2.31 | 1.49 | 70.24 | L1 (concave convex) (meniscus) |
| S2 | 217.63 | 0.10 | | | |
| S3 | 5.47 | 2.56 | 1.85 | 23.78 | L2 (convex concave) (meniscus) |
| S4 | 3.00 | 2.04 | | | |
| S5 | INF. | 1.10 | | | Aperture 14 |

TABLE 3-continued

F/# = 2.6; TTL = 25.0 (mm)
DFOV = 45.5°; LT/DL = 1.664
D1/DL = 1.281; IMH = 5.15 (mm)

| Surface | Radius of curvature (mm) | Interval (mm) | Refractive power | Abbe number | Element |
|---|---|---|---|---|---|
| S6 | −4.96 | 0.50 | 1.6 | 39.24 | L3 (bi-concave) |
| S7 | 17.07 | 1.90 | 1.64 | 60.1 | L4 (bi-convex) |
| S8 | −7.57 | 0.13 | | | |
| S9* | 18.00 | 3.80 | 1.5 | 81.5 | L5 (aspheric) |
| S10* | −5.28 | 9.03 | | | |
| S11 | INF. | 0.71 | 1.52 | 54.5 | Filter 16 |
| S12 | INF. | 0.83 | | | |
| S13 | | | | | Image plane 18 |

The aspheric coefficient and the conic coefficient of each order term of the aspheric lens surface according to the second embodiment of the present invention are listed in Table 4.

TABLE 4

| | S9* | S10* |
|---|---|---|
| k | 0 | 0 |
| A | −4.62E−04 | 7.77E−04 |
| B | 7.61E−05 | −1.77E−05 |
| C | −4.61E−06 | 6.61E−06 |
| D | 2.99E−07 | −3.85E−07 |
| E | −5.96E−09 | 1.30E−08 |

The interval of the surface S1 is the distance on the optical axis 12 from the surface S1 to the surface S2. The interval of the surface S2 is the distance on the optical axis 12 from the surface S2 to the surface S3. The interval of the surface S12 is the distance on the optical path 12 from the surface S12 to the image plane 18 of a visible light at an effective focal length. The lens assembly includes at least two lenses whose Abbe numbers are greater than 60.

Figure 5:
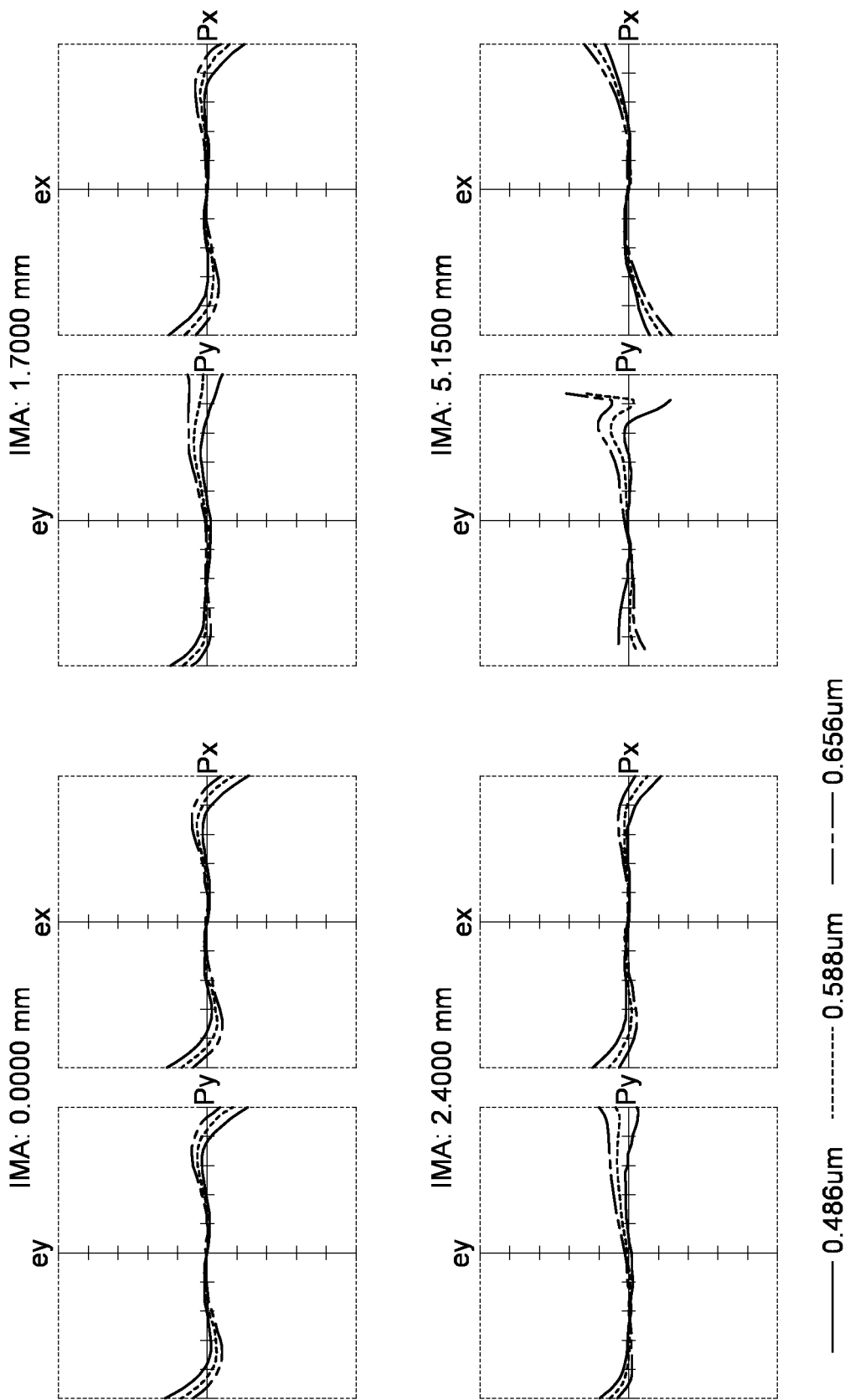
FIGS. 5~6 respectively are a ray fan plot and a longitudinal aberration graph of the lens assembly 10b.
Figure 6:
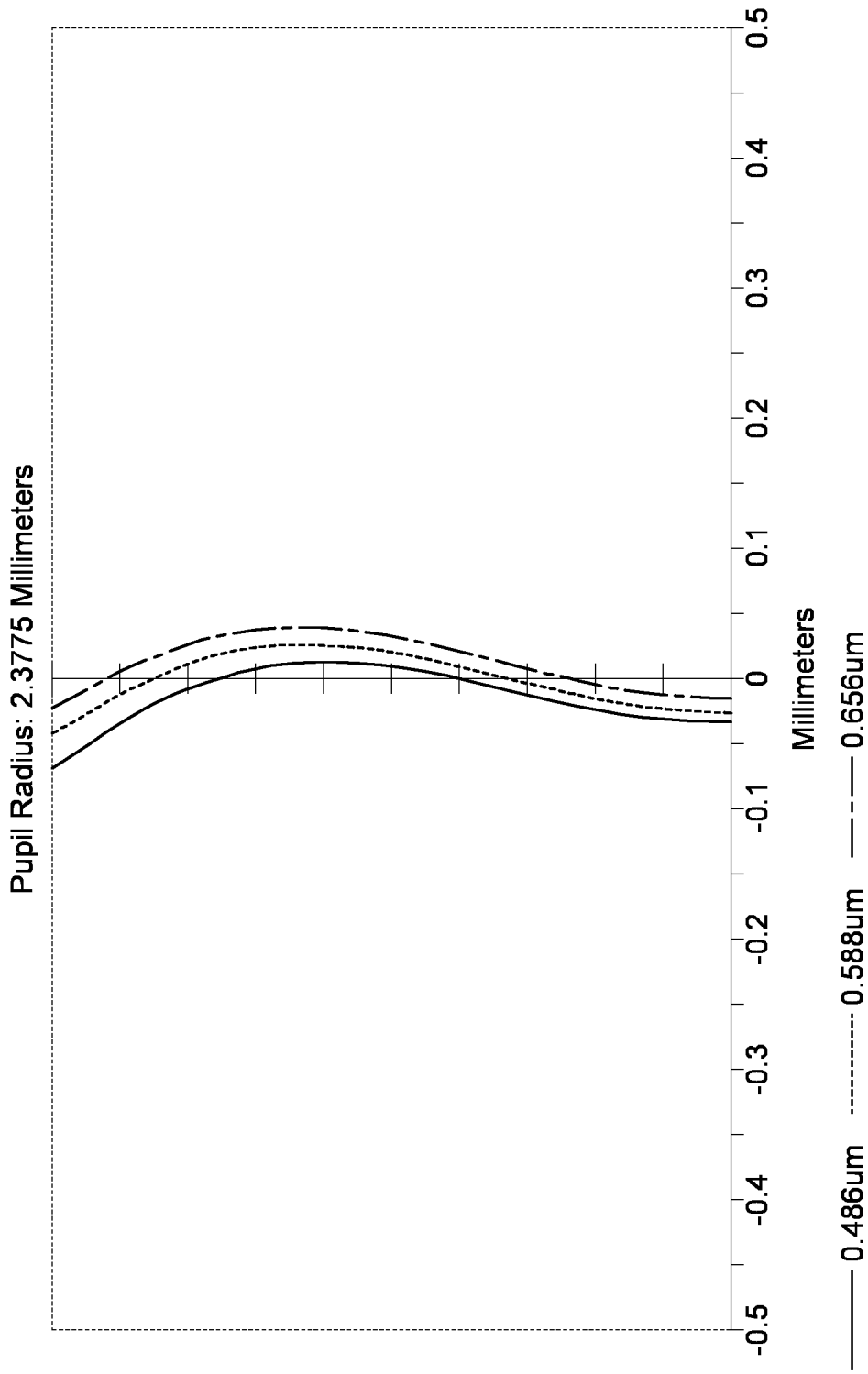

FIGS. 5~6 are based on the simulation data of the lens assembly 10b of the present embodiment. FIG. 5 is a ray fan plot of a visible light, wherein X axis represents the position at which a ray enters the pupil, Y axis represents a relative value of the position at which the chief ray is projected to an image plane (such as the image plane 18). FIG. 6 is a graph of longitudinal aberration of the lens assembly 10b, wherein the three curves from left to right are generated by an incident light having a wavelength of: 0.486 μm, 0.588 μm, 0.656 μm, respectively. The simulation data as illustrated in FIGS. 5~6 are all within standard ranges and suffice to verify that the lens assembly 10b of the present embodiment really possesses excellent optical quality.

Figure 7:
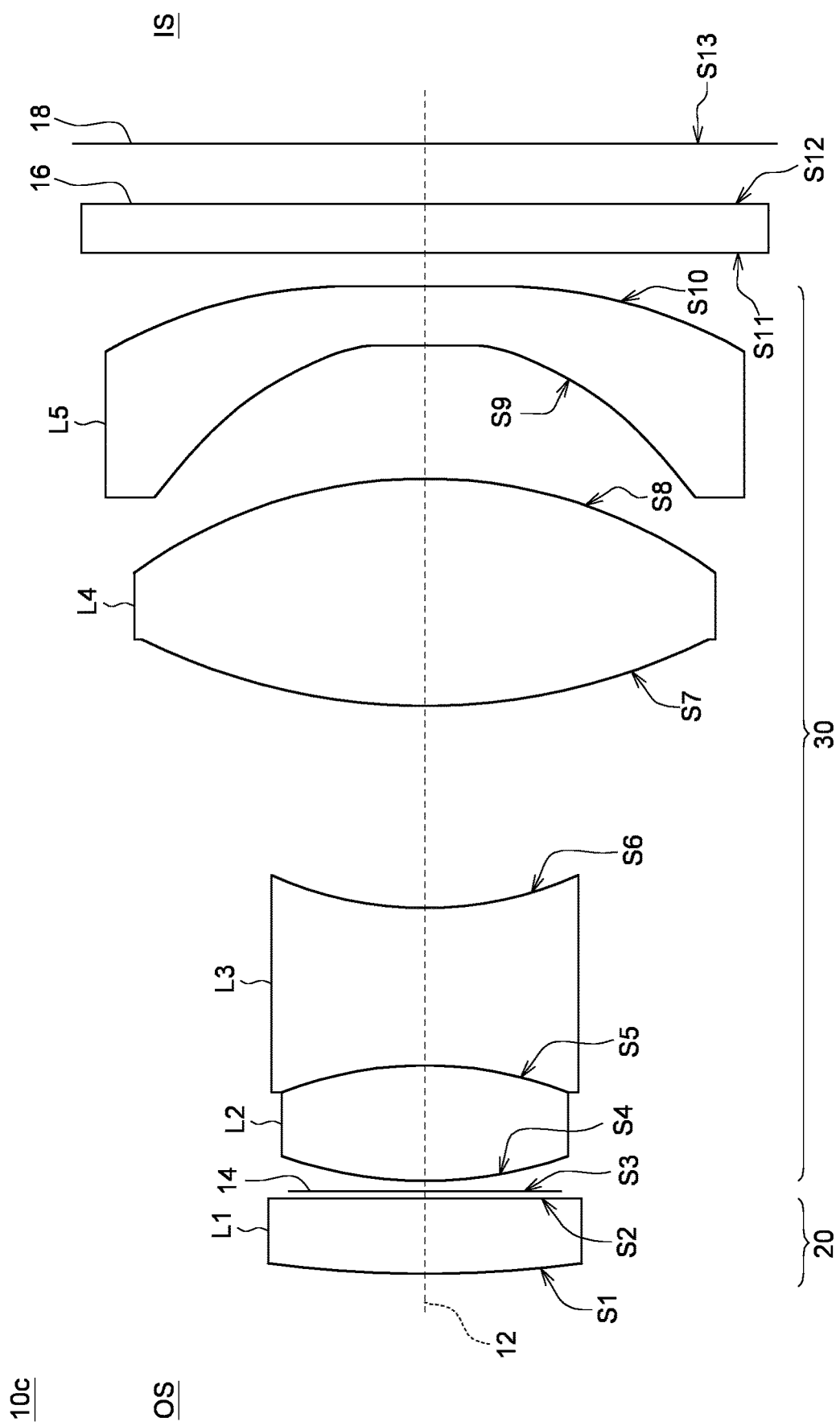
FIG. 7 is a schematic diagram of a lens assembly 10c according to a third embodiment of the present invention.

The design of a lens assembly according to a third embodiment of the present invention is disclosed below. FIG. 7 is a schematic diagram of a lens assembly 10c according to a third embodiment of the present invention. The first lens L1 forms a first lens group (such as a front lens group) 20 with a positive refractive power. The second lens L2, the third lens L3, the fourth lens L4 and the fifth lens L5 form one second lens group (such as a rear lens group) 30 with a positive refractive power. In the present embodiment, the refractive powers of the first lens L1 to the fifth lens L5 of the lens assembly 10c sequentially are: positive, positive, negative, positive, negative, all lenses are formed of glass, and the fifth lens L5 is an aspheric lens. In the present embodiment, the aspheric lens is formed by the glass molding method. In an embodiment, aspheric glass lenses can be replaced by aspheric plastics lenses. In the present embodiment, the second lens L2 and the third lens L3 also form one combined lens, but the present invention is not limited thereto. In the present embodiment, the surface S1 has a diameter of 4.64 mm, and the surface S10 has a diameter of 9.58 mm. The design parameters of the lens assembly 10c and the peripheral elements are listed in Table 5.

Figure 8:
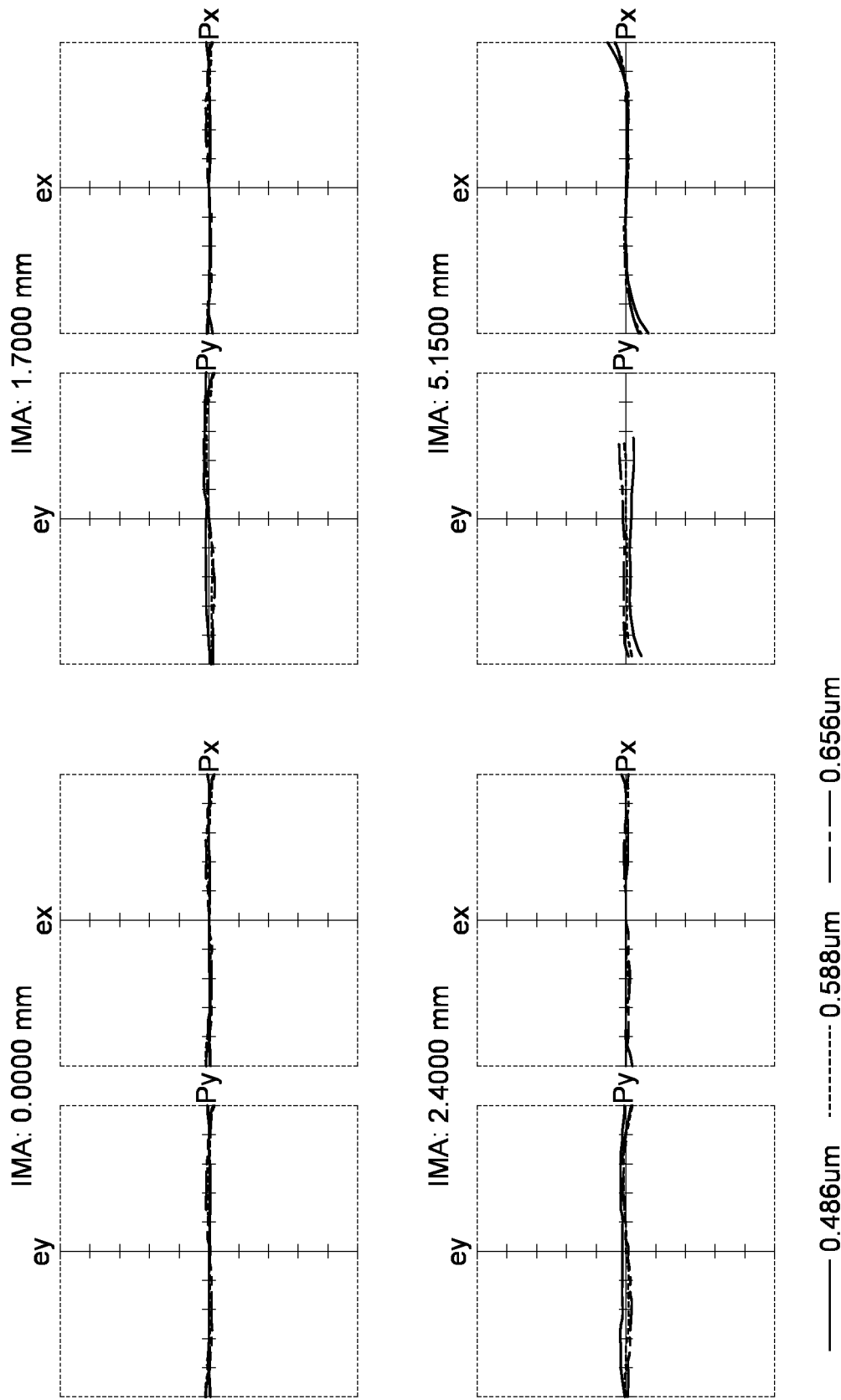
FIGS. 8~9 respectively are a ray fan plot and a longitudinal aberration graph of the lens assembly 10c.
Figure 9:
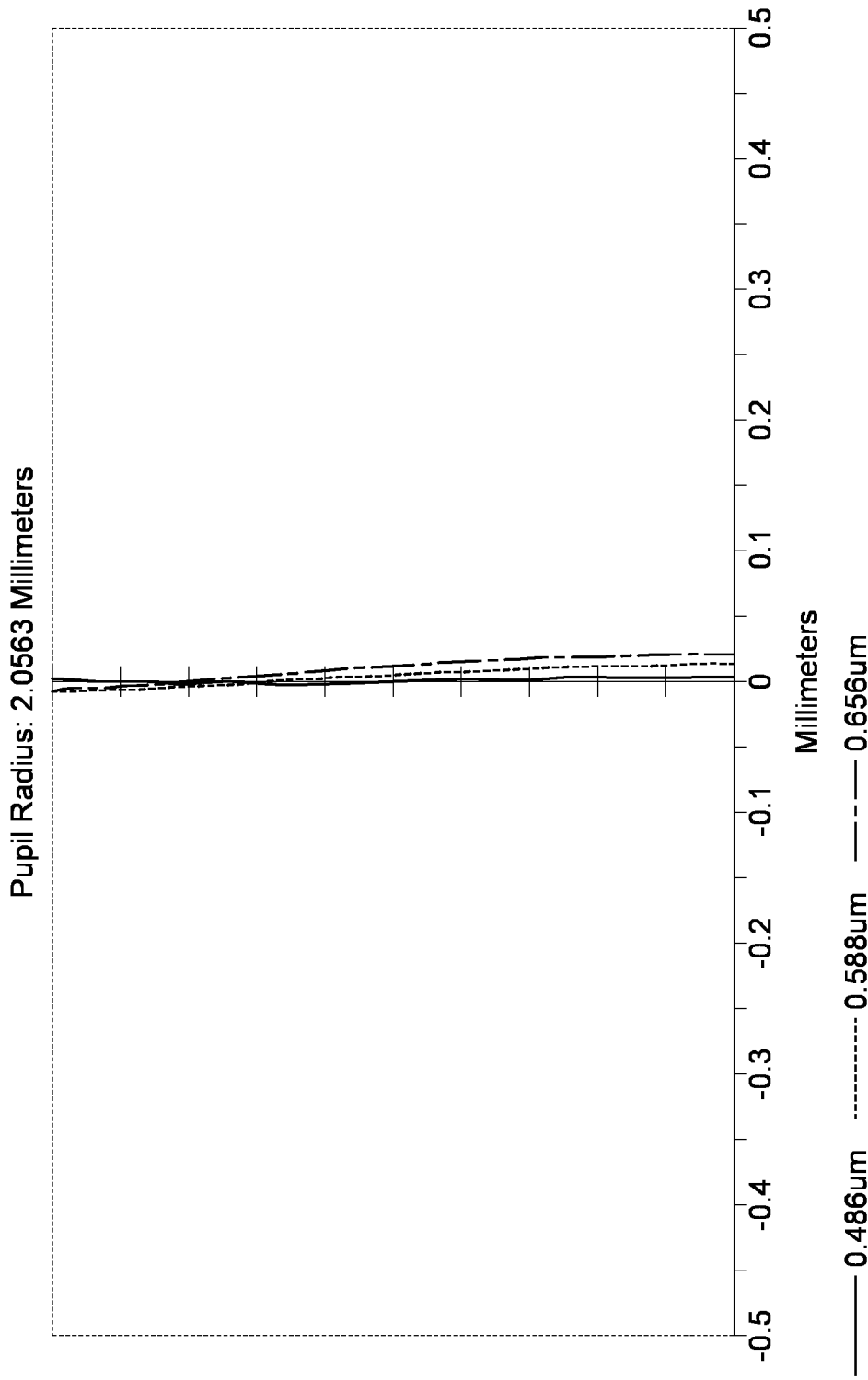

FIGS. 8~9 are based on the simulation data of the lens assembly 10c of the present embodiment. FIG. 8 is a ray fan plot of a visible light, wherein X axis represents the position at which a ray enters the pupil, Y axis represents a relative value of the position at which the chief ray is projected to an image plane (such as the image plane 18). FIG. 9 is a graph of longitudinal aberration of the lens assembly 10c, wherein

TABLE 5

F/# = 3.0; TTL = 15.9 (mm)
DFOV = 46.9°; LT/DL = 1.454
D1/DL = 0.484; IMH = 5.15 (mm)

| Surface | Radius of curvature (mm) | Interval (mm) | Refractive power | Abbe number | Element |
|---|---|---|---|---|---|
| S1  | 16.75 | 1.06 | 1.76 | 40.1  | L1 (plano-convex) |
| S2  | INF.  | 0.10 |      |       |                  |
| S3  | INF.  | 0.15 |      |       | Aperture 14      |
| S4  | 6.73  | 1.60 | 1.62 | 63.3  | L2 (bi-convex)   |
| S5  | −6.84 | 2.20 | 1.67 | 38.15 | L3 (bi-concave)  |
| S6  | 5.32  | 2.91 |      |       |                  |
| S7  | 10.40 | 3.15 | 1.62 | 63.3  | L4 (bi-convex)   |
| S8  | −7.95 | 1.94 |      |       |                  |
| S9* | −7.47 | 0.80 | 1.73 | 40.5  | L5 (aspheric)    |
| S10*| 17.08 | 0.47 |      |       |                  |
| S11 | INF.  | 0.71 | 1.52 | 54.5  | Filter 16        |
| S12 | INF.  | 0.83 |      |       |                  |
| S13 |       |      |      |       | Image plane 18   |

The aspheric coefficient and the conic coefficient of each order term of the aspheric lens surface according to the second embodiment of the present invention are listed in Table 6.

TABLE 6

|   | S9* | S10* |
|---|---|---|
| k | 0 | 0 |
| A | −9.13E−03 | −8.03E−03 |
| B | 6.52E−04 | 5.00E−04 |
| C | −2.47E−05 | −2.29E−05 |
| D | 4.26E−07 | 6.26E−07 |
| E | −7.58E−09 | −5.25E−09 |
| F | 5.83E−10 | −2.04E−10 |
| G | −1.43E−11 | 4.66E−12 |

The interval of the surface S1 is the distance on the optical axis 12 from the surface S1 to the surface S2. The interval of the surface S2 is the distance on the optical axis 12 from the surface S2 to the surface S3. The interval of the surface S12 is the distance on the optical path 12 from the surface S12 to the image plane 18 of a visible light at an effective focal length. The lens assembly includes at least two lenses whose Abbe numbers are greater than 60.

the three curves from left to right are generated by an incident light having a wavelength of: 0.486 µm, 0.588 µm, 0.656 µm, respectively. The simulation data as illustrated in FIGS. 8~9 are all within standard ranges and suffice to verify that the lens assembly 10c of the present embodiment really possesses excellent optical quality.

Figure 10:
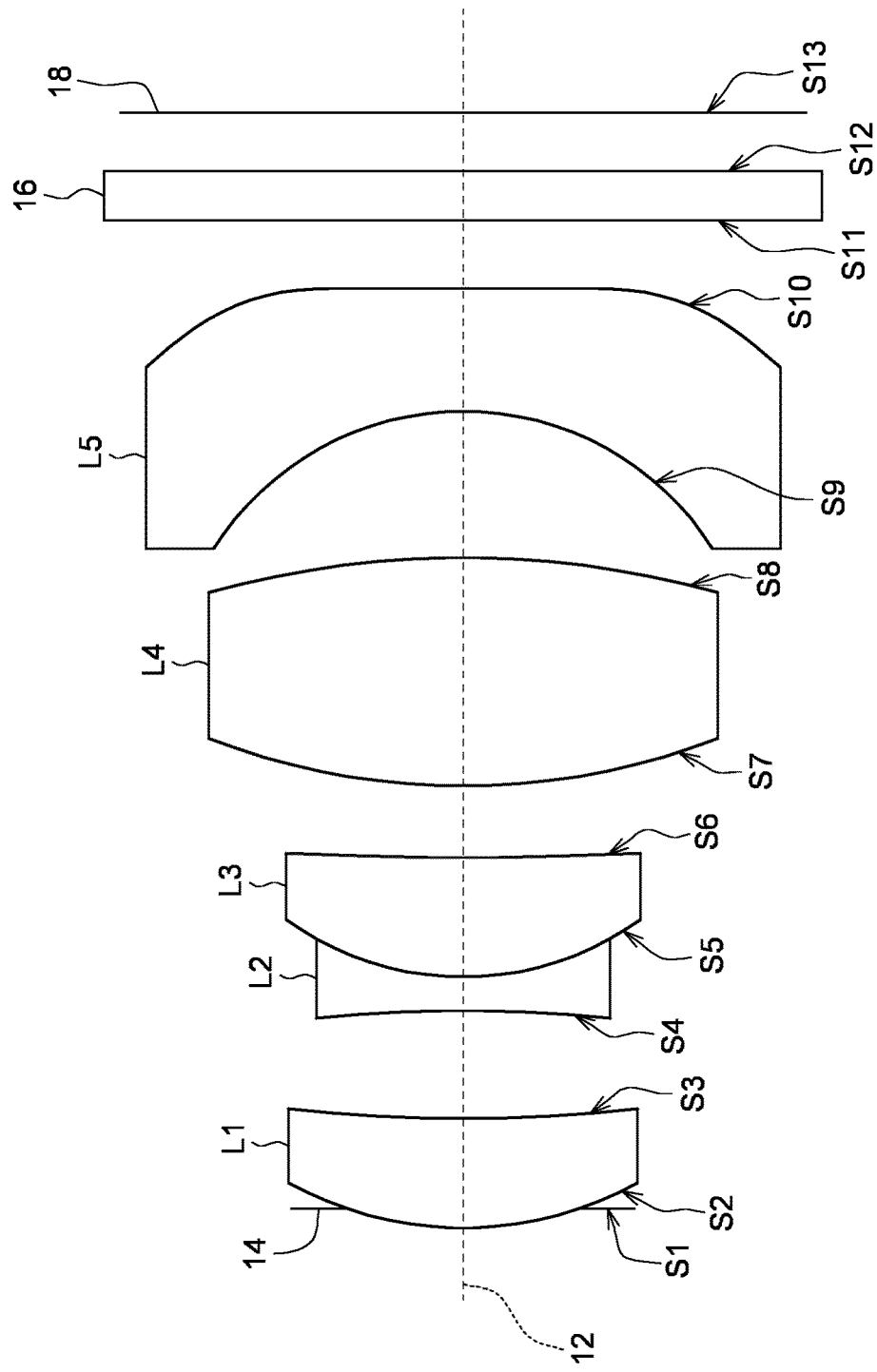
FIG. 10 is a schematic diagram of a lens assembly 10d according to a fourth embodiment of the present invention.

The design of a lens assembly according to a fourth embodiment of the present invention is disclosed below. FIG. 10 is a schematic diagram of a lens assembly 10d according to a fourth embodiment of the present invention. In the present embodiment, the refractive powers of the first lens L1 to the fifth lens L5 of the lens assembly 10d sequentially are: positive, negative, positive, positive, negative, all lenses are formed of glass, and the fifth lens L5 is an aspheric lens. In the present embodiment, the aspheric lens is formed by the glass molding method. In an embodiment, aspheric glass lenses can be replaced by aspheric plastics lenses. In the present embodiment, the second lens L2 and the third lens L3 also form one combined lens, but the present invention is not limited thereto. In the present embodiment, the surface S1 has a diameter of 4.74 mm, and the surface S10 has a diameter of 9.0 mm. The design parameters of the lens assembly 10d and the peripheral elements are listed in Table 7.

TABLE 7

F/# = 2.6; TTL = 15.95 (mm)
DFOV = 47.3°; LT/DL = 1.484
D1/DL = 0.523; IMH = 5.15 (mm)

| Surface | Radius of curvature (mm) | Interval (mm) | Refractive power | Abbe number | Element |
|---|---|---|---|---|---|
| S1 | INF. | 0 | | | Aperture 14 |
| S2 | 6.89 | 1.56 | 2 | 29.13 | L1 (concave convex) (meniscus) |
| S3 | 29.59 | 1.51 | | | |
| S4 | −24.20 | 0.50 | 1.92 | 18.9 | L2 (bi-concave) |
| S5 | 5.50 | 1.71 | 1.49 | 70.24 | L3-(concave convex) (meniscus) |

TABLE 7-continued

F/# = 2.6; TTL = 15.95 (mm)
DFOV = 47.3°; LT/DL = 1.484
D1/DL = 0.523; IMH = 5.15 (mm)

| Surface | Radius of curvature (mm) | Interval (mm) | Refractive power | Abbe number | Element |
|---|---|---|---|---|---|
| S6 | 44.10 | 1.04 | | | |
| S7 | 12.80 | 3.25 | 2 | 29.13 | L4 (bi-convex) |
| S8 | −17.39 | 2.12 | | | |
| S9* | −9.80 | 1.75 | 1.58 | 59.4 | L5 (aspheric) |
| S10* | 17.21 | 0.97 | | | |
| S11 | INF. | 0.71 | 1.52 | 54.5 | Filter 16 |
| S12 | INF. | 0.83 | | | |
| S13 | | | | | Image plane 18 |

The aspheric coefficient and the conic coefficient of each order term of the aspheric lens surface according to the second embodiment of the present invention are listed in Table 8.

TABLE 8

| | S9* | S10* |
|---|---|---|
| k | 0 | 0 |
| A | −4.67E−03 | −3.81E−03 |
| B | 4.67E−05 | 4.88E−05 |
| C | 5.94E−07 | −2.20E−07 |

The interval of the surface S1 is the distance on the optical axis 12 from the surface S1 to the surface S2. The interval of the surface S2 is the distance on the optical axis 12 from the surface S2 to the surface S3. The interval of the surface S12 is the distance on the optical path 12 from the surface S12 to the image plane 18 of a visible light at an effective focal length. The lens assembly includes at least two lenses whose Abbe numbers are greater than 58.

Figure 11:
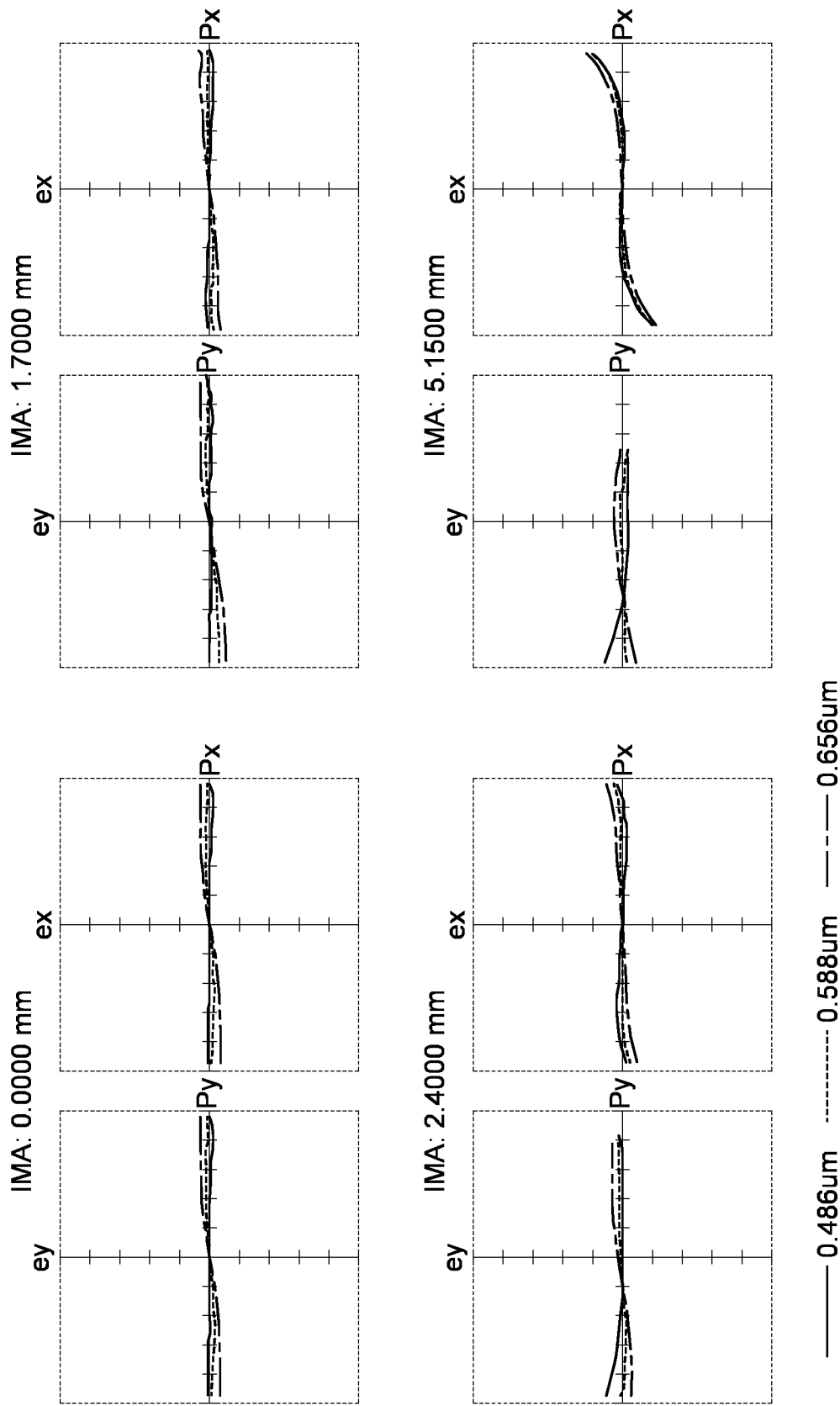
FIGS. 11~12 respectively are a ray fan plot and a longitudinal aberration graph of the lens assembly 10d.
Figure 12:
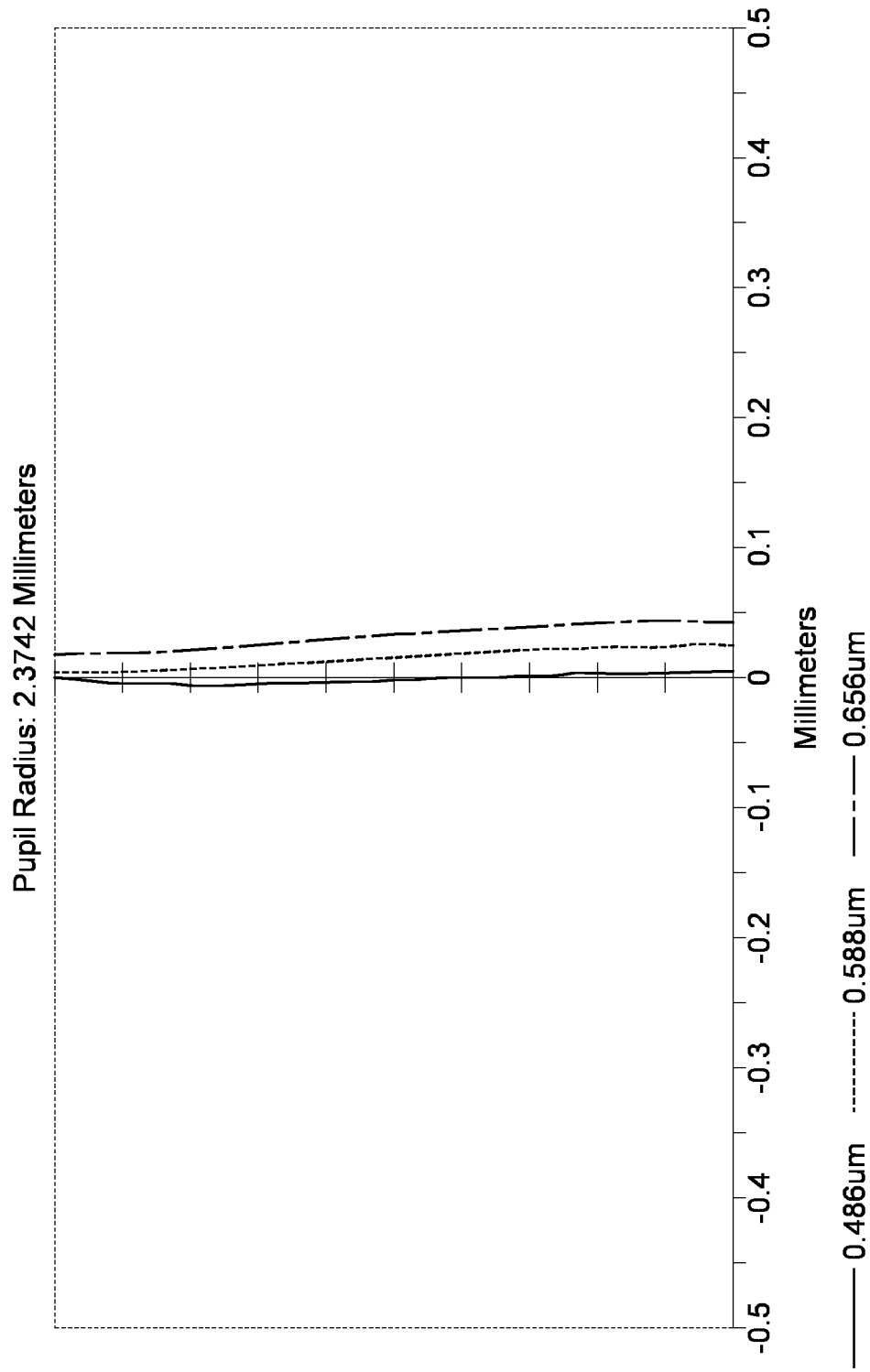

FIGS. 11~12 are based on the simulation data of the lens assembly 10d of the present embodiment. FIG. 11 is a ray fan plot of a visible light, wherein X axis represents the position at which a ray enters the pupil, Y axis represents a relative value of the position at which the chief ray is projected to an image plane (such as the image plane 18). FIG. 12 is a graph of longitudinal aberration of the lens assembly 10d, wherein the three curves from left to right are generated by an incident light having a wavelength of: 0.486 μm, 0.588 μm, 0.656 μm, respectively. The simulation data as illustrated in FIGS. 11~12 are all within standard ranges and suffice to verify that the lens assembly 10d of the present embodiment really possesses excellent optical quality.

Figure 13:
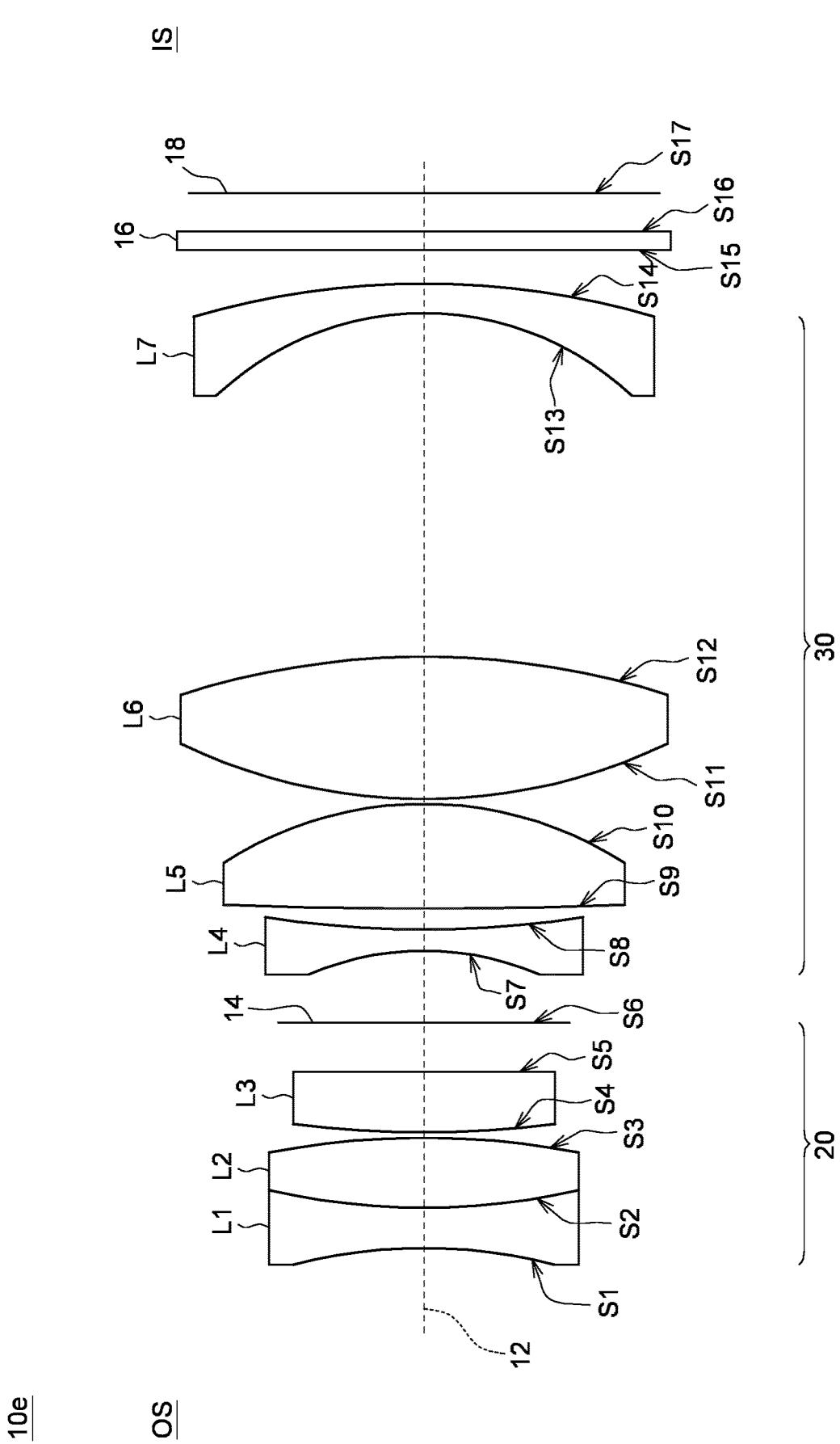
FIG. 13 is a schematic diagram of a lens assembly 10e according to a fifth embodiment of the present invention.

The design of a lens assembly according to a fifth embodiment of the present invention is disclosed below. FIG. 13 is a schematic diagram of a lens assembly 10e according to a fifth embodiment of the present invention. In the present embodiment, the refractive powers of the first lens L1 to the seventh lens L7 of the lens assembly 10e sequentially are: negative, positive, positive, negative, positive, positive, negative, and all lenses are spherical glass lenses. The first lens L1, the second lens L2 and the third lens L3 form a first lens group (such as a front lens group) 20 with a positive refractive power. The fourth lens L4, the fifth lens L5, the sixth lens L6 and the seventh lens L7 form a second lens group (such as a rear lens group) 30 with a positive refractive power. In the present embodiment, the first lens L1 and the second lens L2 also form one combined lens, but the present invention is not limited thereto. In the present embodiment, the surface S1 has a diameter of 6.0 mm, and the surface S13 has a diameter of 9.2 mm. The design parameters of the lens assembly 10e and the peripheral elements are listed in Table 9.

TABLE 9

F/# = 2.6; TTL = 24.88 (mm)
DFOV = 47.2°; LT/DL = 2.251
D1/DL = 0.616; IMH = 5.15 (mm)

| Surface | Radius of curvature (mm) | Interval (mm) | Refractive power | Abbe number | Element |
|---|---|---|---|---|---|
| S1 | −11.83 | 0.92 | 1.72 | 29.52 | L1 (bi-concave) |
| S2 | 15.95 | 1.62 | 1.9 | 31.32 | L2 (bi-convex) |
| S3 | −15.95 | 0.10 | | | |
| S4 | 24.56 | 1.33 | 1.9 | 31.32 | L3 (plano-convex) |
| S5 | INF. | 0.39 | | | |
| S6 | INF. | 2.38 | | | Aperture 14 |
| S7 | −6.90 | 0.50 | 1.72 | 29.52 | L4 (bi-concave) |
| S8 | 23.31 | 0.46 | | | |
| S9* | 116.62 | 2.43 | 1.6 | 67.72 | L5 (bi-convex) |
| S10* | −8.02 | 0.10 | | | |
| S11 | 12.87 | 3.27 | 1.6 | 67.72 | L6 (bi-convex) |
| S12 | −16.87 | 7.79 | | | |
| S13 | −7.07 | 0.63 | 1.62 | 36.62 | L7(convex concave) (meniscus |
| S14 | −18.86 | 0.64 | | | |

TABLE 9-continued

F/# = 2.6; TTL = 24.88 (mm)
DFOV = 47.2°; LT/DL = 2.251
D1/DL = 0.616; IMH = 5.15 (mm)

| Surface | Radius of curvature (mm) | Interval (mm) | Refractive power | Abbe number | Element |
|---|---|---|---|---|---|
| S15 | INF. | 0.71 | 1.52 | 54.5 | Filter 16 |
| S16 | INF. | 0.82 | | | |
| S17 | INF. | | | | Image plane 18 |

The interval of the surface S1 is the distance on the optical axis 12 from the surface S1 to the surface S2. The interval of the surface S2 is the distance on the optical axis 12 from the surface S2 to the surface S3. The interval of the surface S16 is the distance on the optical path 12 from the surface S16 to the image plane 18 of a visible light at an effective focal length. The lens assembly includes at least two lenses whose Abbe numbers are greater than 60.

Figure 14:
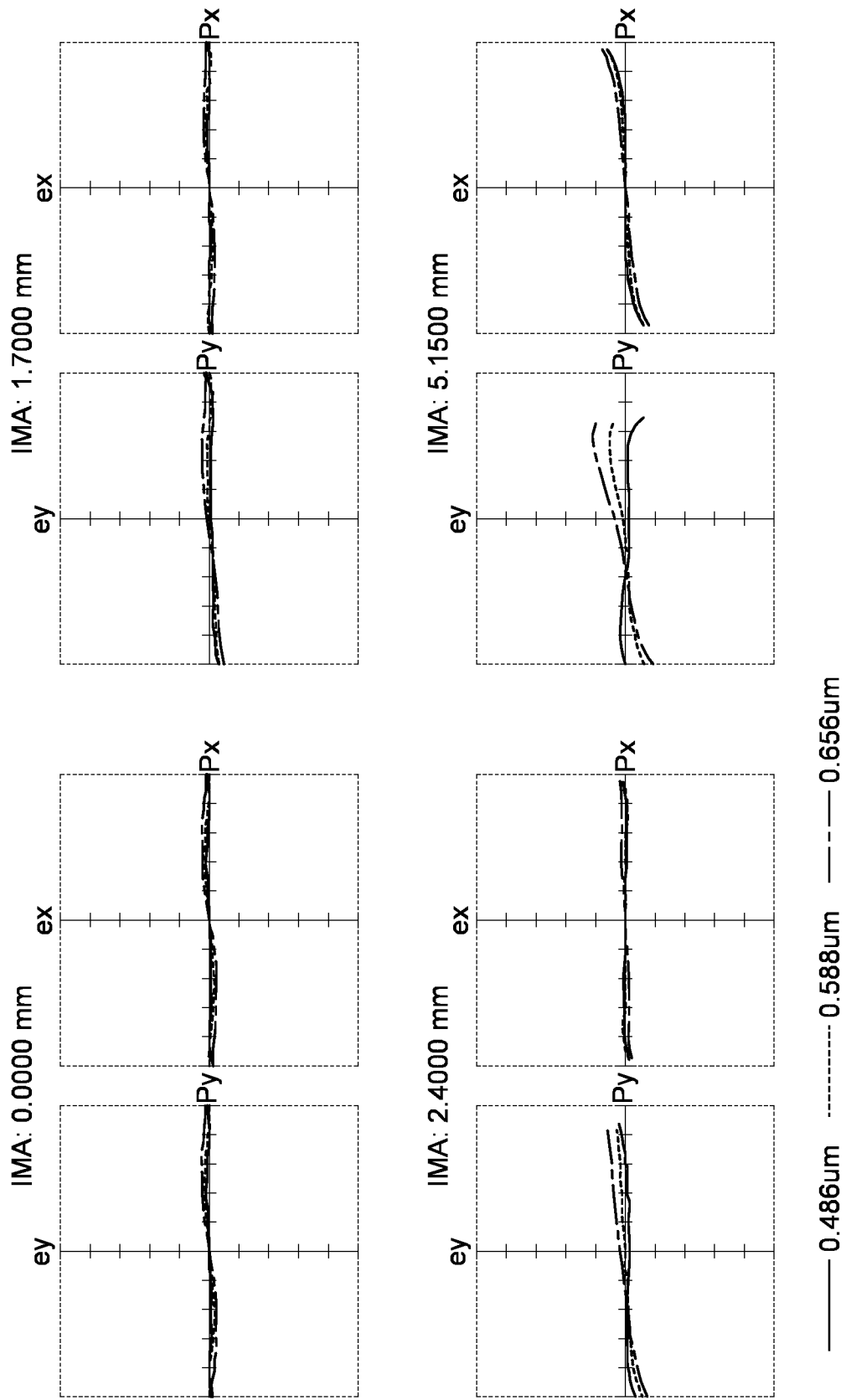
FIGS. 14~15 respectively are a ray fan plot and a longitudinal aberration graph of the lens assembly 10e.
Figure 15:
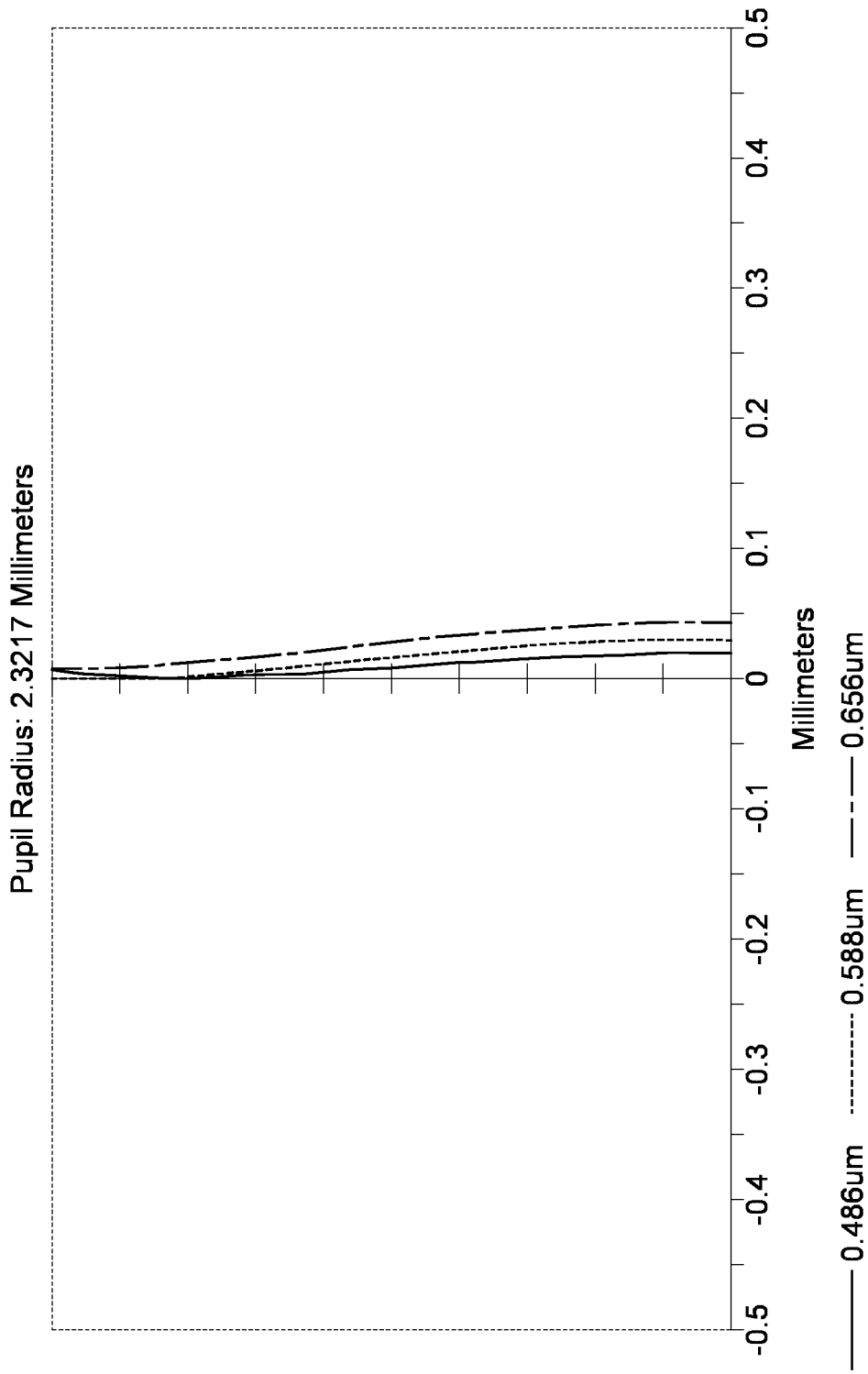

FIGS. 14~15 are based on the simulation data of the lens assembly 10e of the present embodiment. FIG. 14 is a ray fan plot of a visible light, wherein X axis represents the position at which a ray enters the pupil, Y axis represents a relative value of the position at which the chief ray is projected to an image plane (such as the image plane 18). FIG. 15 is a graph of longitudinal aberration of the lens assembly 10e, wherein the three curves from left to right are generated by an incident light having a wavelength of: 0.486 μm, 0.588 μm, 0.656 μm, respectively. The simulation data as illustrated in FIGS. 14~15 are all within standard ranges and suffice to verify that the lens assembly 10e of the present embodiment really possesses excellent optical quality.

Figure 16:
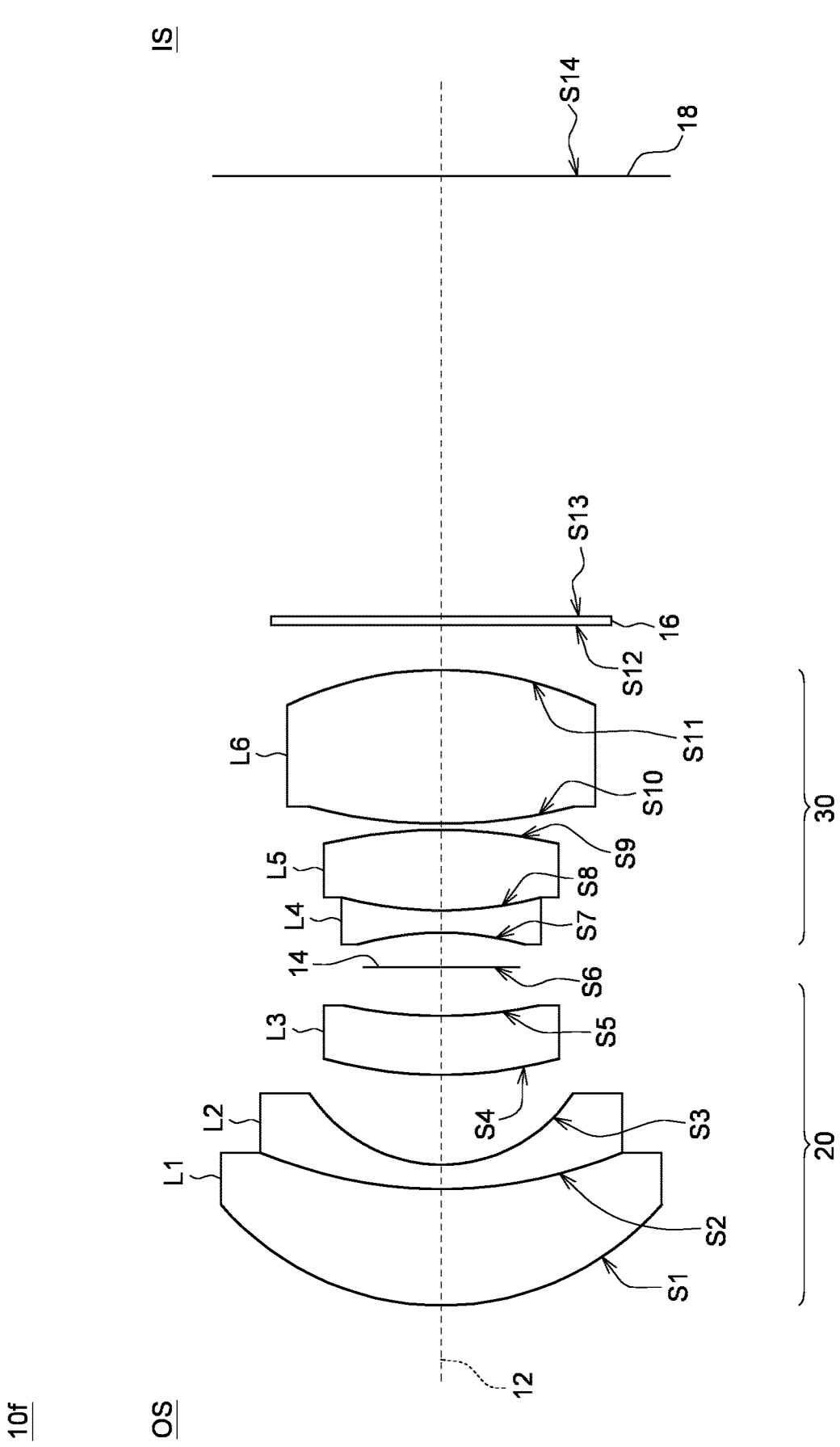
FIG. 16 is a schematic diagram of a lens assembly 10f according to a sixth embodiment of the present invention.

The design of a lens assembly according to a sixth embodiment of the present invention is disclosed below. FIG. 16 is a schematic diagram of a lens assembly 10f according to a sixth embodiment of the present invention. In the present embodiment, the refractive powers of the first lens L1 to the sixth lens L6 of the lens assembly 10f sequentially are: positive, negative, positive, negative, positive, positive, and lenses L1~L5 are spherical glass lenses. The first lens L1, the second lens L2 and the third lens L3 form a first lens group (such as a front lens group) 20 with a negative refractive power. The fourth lens L4, the fifth lens L5 and the sixth lens L6 form a second lens group (such as a rear lens group) 30 with a positive refractive power. In the present embodiment, the first lens L1 and the second lens L2 form one cemented lens, and the fourth lens L4 and the fifth lens L5 form the other cemented lens but the present invention is not limited thereto. In the present embodiment, the surface S1 has a diameter of 10.0 mm, and the surface S11 has a diameter of 7.0 mm. The design parameters of the lens assembly 10f and the peripheral elements are listed in Table 10.

TABLE 10

F/# = 2.75; TTL = 25.05 (mm)
DFOV = 48.4°; LT/DL = 2.051
D1/DL = 1.429; IMH = 5.15 (mm)

| Surface | Radius of curvature (mm) | Interval (mm) | Refractive power | Abbe number | Element |
|---|---|---|---|---|---|
| S1 | 6.62 | 2.61 | 2 | 29.13 | L1 (concave convex) (meniscus) |
| S2 | 10.39 | 0.57 | 1.76 | 26.52 | L2-(convex concave) (meniscus) |
| S3 | 3.59 | 2.01 | | | |
| S4 | 9.45 | 1.33 | 2 | 28.27 | L3-(concave convex) (meniscus) |
| S5 | 9.90 | 1.11 | | | |
| S6 | INF. | 0.77 | | | Aperture 14 |
| S7 | −6.95 | 0.50 | 1.78 | 25.68 | L4 (bi-concave) |
| S8 | 8.50 | 1.82 | 1.9 | 31.32 | L5 (bi-convex) |
| S9 | −11.31 | 0.13 | | | |
| S10* | 12.06 | 3.50 | 1.5 | 81.5 | L6 (aspheric) |
| S11* | −6.57 | 1.00 | | | |
| S12 | INF. | 0.21 | 52 | 54.5 | Filter 16 |
| S13 | INF. | 9.94 | | | |
| S14 | INF. | | | | Image plane 18 |

The aspheric coefficient and the conic coefficient of each order term of the aspheric lens surface according to the sixth embodiment of the present invention are listed in Table 11.

TABLE 11

| | S10* | S11* |
|---|---|---|
| k | 0 | 0 |
| A | 1.41E−04 | 9.91E−04 |
| B | 1.84E−05 | −3.16E−05 |
| C | 5.34E−06 | 1.70E−05 |
| D | −1.40E−06 | −2.58E−06 |
| E | 2.38E−07 | 2.45E−07 |
| F | −2.03E−08 | −1.20E−08 |
| G | 6.71E−10 | 2.43E−10 |

The interval of the surface S1 is the distance on the optical axis 12 from the surface S1 to the surface S2. The interval of the surface S2 is the distance on the optical axis 12 from the surface S2 to the surface S3. The interval of the surface S13 is the distance on the optical path 12 from the surface S13 to the image plane 18 of a visible light at an effective focal length. The lens assembly 10f includes at least two lenses whose Abbe numbers are greater than 50.

Figure 17:
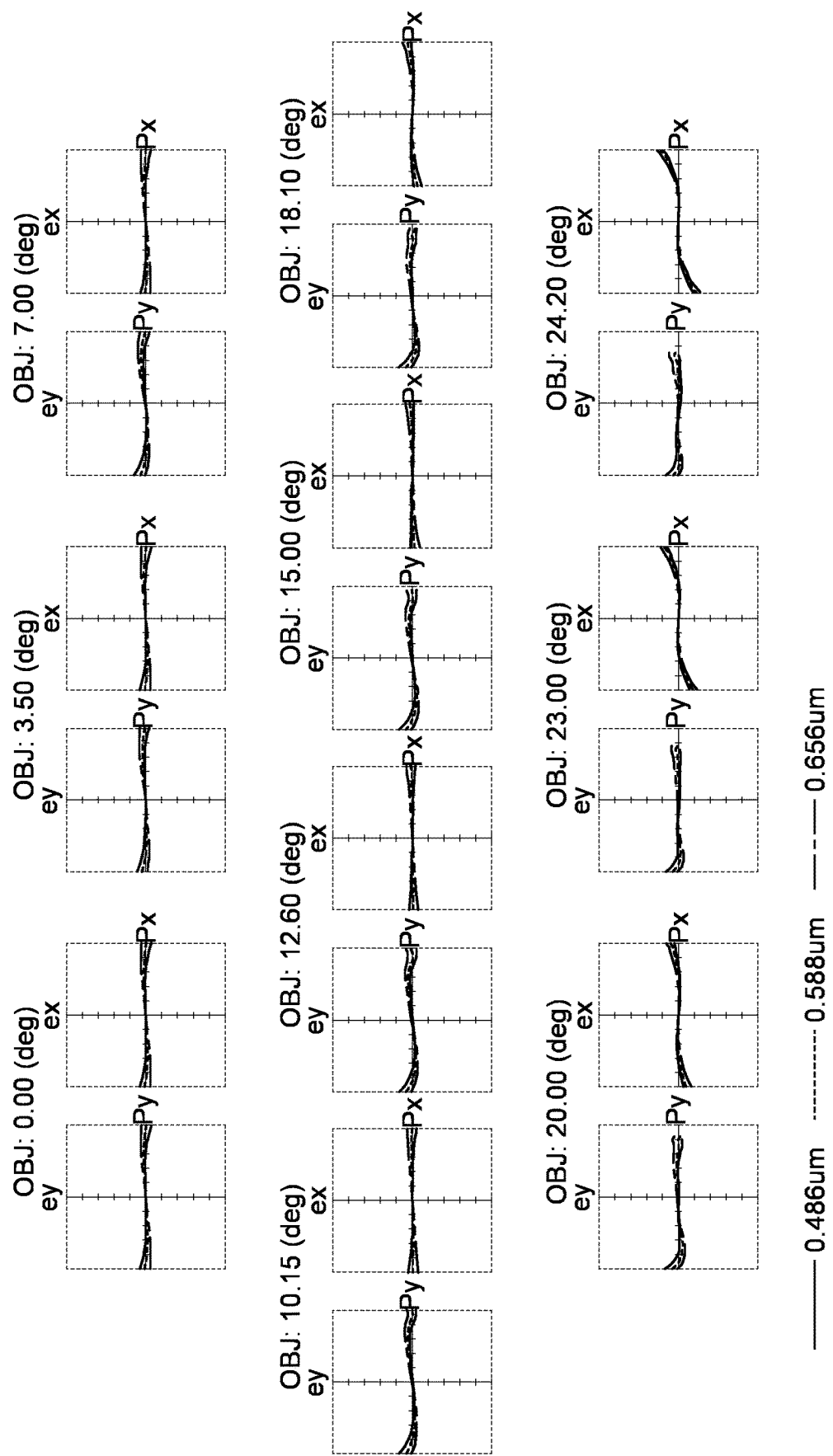
FIGS. 17~18 respectively are a ray fan plot and a longitudinal aberration graph of the lens assembly 10f.
Figure 18:
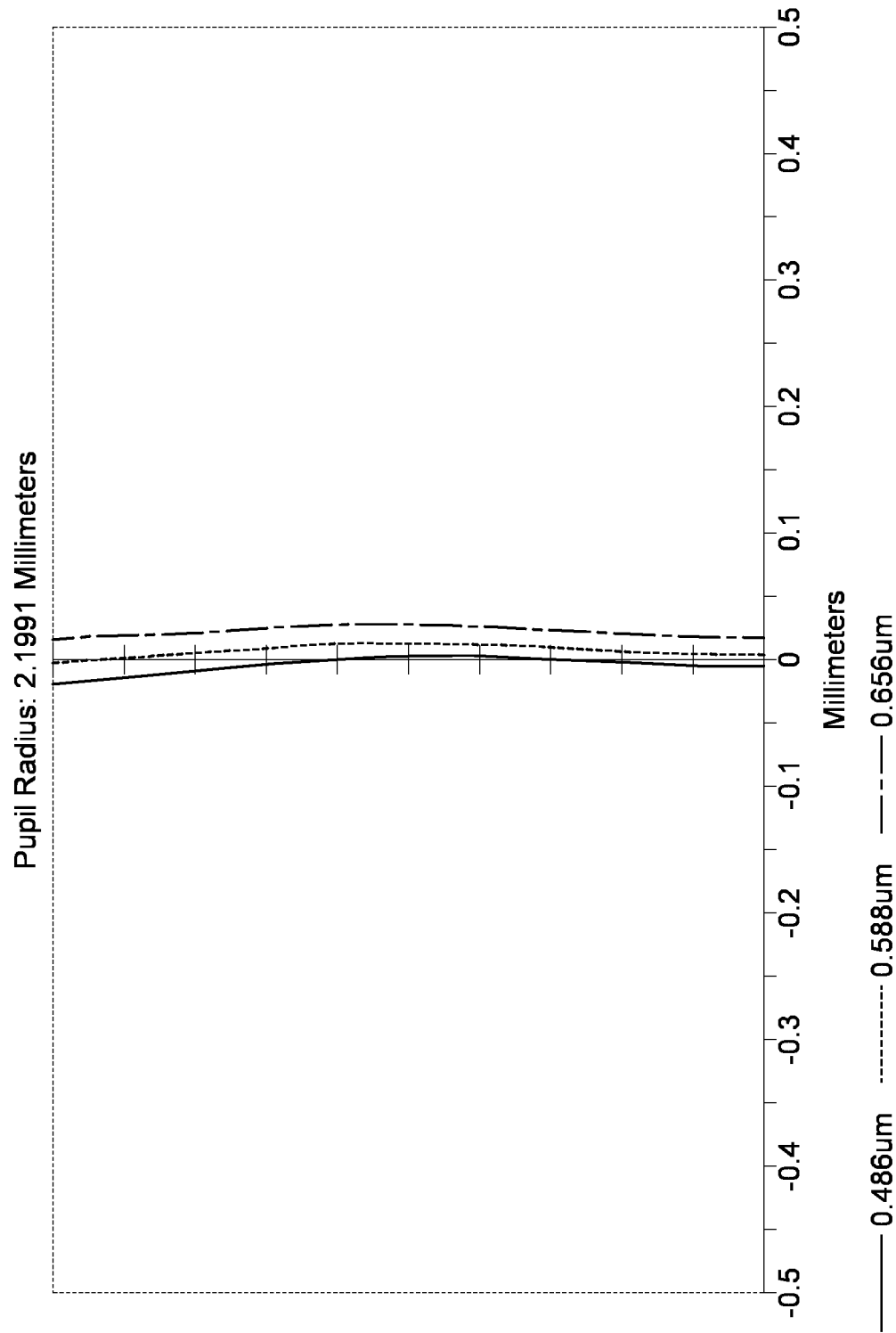

FIGS. 17~18 are based on the simulation data of the lens assembly 10f of the present embodiment. FIG. 17 is a ray fan plot of a visible light, wherein X axis represents the position at which a ray enters the pupil, Y axis represents a relative value of the position at which the chief ray is projected to an image plane (such as the image plane 18). FIG. 18 is a graph of longitudinal aberration of the lens assembly 10f, wherein the three curves from left to right are generated by an incident light having a wavelength of: 0.486 μm, 0.588 μm, 0.656 μm, respectively. The simulation data as illustrated in FIGS. 17~18 are all within standard ranges and suffice to verify that the lens assembly 10f of the present embodiment really possesses excellent optical quality.

Through the design disclosed in the embodiments of the present invention, an image lens possessing the optical features of excellent optical quality and lightweight and capable of reducing manufacturing cost and improving optical quality is provided. Based on the design that the optical lens includes 4~7 lenses and that the total track length (TTL) from the lens to the sensor is less than 25 mm and the maximum outer diameter of the mechanism is less than 14 mm, the optical lens assembly advantageously possesses the features of larger aperture, higher resolution (5 million pixels), lighter weight, longer effective focal length (EFL=12 mm), and larger target surface (1/2.5 inch), the manufacturing cost can be reduced and the optical quality can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising:
a combined lens, wherein the combined lens is formed of two lenses and comprises corresponding adjacent surfaces whose radii of curvature are substantially identical;
a spherical lens and an aspheric lens, wherein the aspheric lens is closer to the image plane of the lens assembly than the combined lens; at most one lens is disposed between the aspheric lens and the image plane of the lens assembly;
more than 3 but less than 8 lenses with a refractive power, wherein D1 is the distance between two edge turning points on a lens surface farthest away from the image plane of the lens assembly; DL is the distance between two edge turning points on a lens surface closest to the image plane of the lens assembly; LT is the length on an optical axis of the lens assembly from the lens surface farthest from the image plane of the lens assembly to the lens surface closest to the image plane of the lens assembly; and
wherein the lens assembly satisfies the following conditions:
(1) 6 mm<DL<20 mm, 1.5<LT/DL<2.4 and D1/DL>0.6 or (2) 6 mm<DL<20 mm, 1.25<LT/DL<1.7 and D1/DL>0.4.

2. The lens assembly according to claim 1, wherein the aperture value (F/#) of the lens assembly is greater than or equivalent to 2.6.

3. The lens assembly according to claim 1, wherein the lens assembly comprises at least two lenses whose Abbe numbers are greater than 58.

4. The lens assembly according to claim 1, wherein the total length of the lens assembly (LT) is less than 25 mm.

5. The lens assembly according to claim 1, wherein the lens assembly satisfies one of the following conditions: (1) the lenses arranged from the image magnification side to the image reduction side sequentially are a meniscus lens, a meniscus lens, a meniscus lens, a bi-concave lens, a bi-convex lens and an aspheric lens; (2) the lenses arranged from the image magnification side to the image reduction side sequentially are a meniscus lens, a meniscus lens, a bi-concave lens, a bi-convex lens and an aspheric lens; (3) the lenses arranged from the image magnification side to the image reduction side sequentially area plano-convex lens, a bi-convex lens, a bi-concave lens, a bi-convex lens and an aspheric lens; (4) the lenses arranged from the image magnification side to the image reduction side sequentially are a meniscus lens, a bi-concave lens, a meniscus lens, a bi-convex lens and an aspheric lens; (5) the lenses arranged from the image magnification side to the image reduction side sequentially are a bi-concave lens, a bi-convex lens, a plano-convex lens, a bi-concave lens, a bi-convex lens, a bi-convex lens and a meniscus lens.

6. The lens assembly according to claim 1, wherein the lens assembly satisfies one of the following conditions: (1) the refractive powers of the lenses arranged from the image magnification side to the image reduction side sequentially are positive, negative, positive, negative, positive, positive; (2) the refractive powers of the lenses arranged from the image magnification side to the image reduction side sequentially are positive, negative, negative, positive, positive; (3) the refractive powers of the lenses arranged from the image magnification side to the image reduction side sequentially are positive, positive, negative, positive, negative; (4) the refractive powers of the lenses arranged from the image magnification side to the image reduction side sequentially are positive, negative, positive, positive, negative; (5) the refractive powers of the lenses arranged from the image magnification side to the image reduction side sequentially are negative, positive, positive, positive, negative, positive, positive, negative.

7. The lens assembly according to claim 1, wherein DFOV is the diagonal field of view of the lens assembly; the lens assembly satisfies the condition of 40°<DFOV<60°.

8. The lens assembly according to claim 7, wherein the lens assembly satisfies one of the following conditions: (1) the lens assembly further comprises an aperture, and the aspheric lens is disposed between the image reduction side and the aperture; (2) the lens further comprises an aperture, the combined lens is disposed between the image reduction side and the aperture, and the difference in the radius of curvature between two adjacent surfaces of the combined lens is less than 0.005 mm; (3) all lenses are formed of glass.

9. The lens assembly according to claim 7, wherein the aperture value (F/#) of the lens assembly is greater than or equivalent to 2.6.

10. The lens assembly according to claim 7, wherein the lens assembly comprises at least two lenses whose Abbe numbers are greater than 58.

11. The lens assembly according to claim 7, wherein the total length of the lens assembly (LT) is less than 25 mm.

12. The lens assembly according to claim 7, wherein the lens assembly satisfies one of the following conditions: (1) the lenses arranged from the image magnification side to the image reduction side sequentially are a meniscus lens, a meniscus lens, a meniscus lens, a bi-concave lens, a bi-convex lens and an aspheric lens; (2) the lenses arranged from the image magnification side to the image reduction side sequentially are a meniscus lens, a meniscus lens, a bi-concave lens, a bi-convex lens and an aspheric lens; (3) the lenses arranged from the image magnification side to the image reduction side sequentially area plano-convex lens, a bi-convex lens, a bi-concave lens, a bi-convex lens and an aspheric lens; (4) the lenses arranged from the image magnification side to the image reduction side sequentially are a meniscus lens, a bi-concave lens, a meniscus lens, a bi-convex lens and an aspheric lens; (5) the lenses arranged from the image magnification side to the image reduction side sequentially are a bi-concave lens, a bi-convex lens, a plano-convex lens, a bi-concave lens, a bi-convex lens, a bi-convex lens and a meniscus lens.

13. The lens assembly according to claim 7, wherein the lens assembly satisfies one of the following conditions: (1) the refractive powers of the lenses arranged from the image magnification side to the image reduction side sequentially are positive, negative, positive, negative, positive, positive; (2) the refractive powers of the lenses arranged from the image magnification side to the image reduction side sequentially are positive, negative, negative, positive, positive; (3) the refractive powers of the lenses arranged from the image magnification side to the image reduction side sequentially are positive, positive, negative, positive, negative; (4) the refractive powers of the lenses arranged from the image magnification side to the image reduction side sequentially are positive, negative, positive, positive, negative; (5) the refractive powers of the lenses arranged from the image magnification side to the image reduction side sequentially are negative, positive, positive, negative, positive, positive, negative.

14. The lens assembly according to claim 1, wherein an Abbe number of at least one lens of the combined lens and an Abbe number of the aspheric lens both are greater than 60; the surface of the aspheric lens facing the image plane of the lens assembly on the lens optical path is protruded towards the image plane of the lens assembly.

15. The lens assembly according to claim 14, wherein the lens assembly satisfies one of the following conditions: (1) the lens assembly further comprises an aperture, and the aspheric lens is disposed between the image reduction side and the aperture; (2) the lens assembly further comprises an aperture, the combined lens is disposed between the image reduction side and the aperture, and the difference in the radius of curvature between two adjacent surfaces of the combined lens is less than 0.005 mm; (3) all lenses are formed of glass.

16. The lens assembly according to claim 14, wherein the aperture value (F/#) of the lens assembly is greater than or equivalent to 2.6.

17. The lens assembly according to claim 14, wherein the lens assembly comprises at least two lenses whose Abbe numbers are greater than 58.

18. The lens assembly according to claim 14, wherein the total length of the lens assembly (LT) is less than 25 mm.

19. The lens assembly according to claim 14, wherein the lens assembly satisfies one of the following conditions: (1) the lenses arranged from the image magnification side to the image reduction side sequentially are a meniscus lens, a meniscus lens, a meniscus lens, a bi-concave lens, a bi-convex lens and an aspheric lens; (2) the lenses arranged from the image magnification side to the image reduction side sequentially are a meniscus lens, a meniscus lens, a bi-concave lens, a bi-convex lens and an aspheric lens; (3) the lenses arranged from the image magnification side to the image reduction side sequentially area plano-convex lens, a bi-convex lens, a bi-concave lens, a bi-convex lens and an aspheric lens; (4) the lenses arranged from the image magnification side to the image reduction side sequentially are a meniscus lens, a bi-concave lens, a meniscus lens, a bi-convex lens and an aspheric lens; (5) the lenses arranged from the image magnification side to the image reduction side sequentially are a bi-concave lens, a bi-convex lens, a plano-convex lens, a bi-concave lens, a bi-convex lens, a bi-convex lens and a meniscus lens.

20. The lens assembly according to claim 14, wherein the lens assembly satisfies one of the following conditions: (1) the refractive powers of the lenses arranged from the image magnification side to the image reduction side sequentially are positive, negative, positive, negative, positive, positive; (2) the refractive powers of the lenses arranged from the image magnification side to the image reduction side sequentially are positive, negative, negative, positive, positive; (3) the refractive powers of the lenses arranged from the image magnification side to the image reduction side sequentially are positive, positive, negative, positive, negative; (4) the refractive powers of the lenses arranged from the image magnification side to the image reduction side sequentially are positive, negative, positive, positive, negative; (5) the refractive powers of the lenses arranged from the image magnification side to the image reduction side sequentially are negative, positive, positive, negative, positive, positive, negative.

* * * * *